United States Patent
Chang et al.

(10) Patent No.: US 6,674,558 B1
(45) Date of Patent: *Jan. 6, 2004

(54) HIGH-THROUGHPUT, LOW-LATENCY NEXT GENERATION INTERNET NETWORKS USING OPTICAL LABEL SWITCHING AND HIGH-SPEED OPTICAL HEADER GENERATION, DETECTION AND REINSERTION

(75) Inventors: Gee-Kung Chang, Holmdel, NJ (US); Winston I. Way, Hsinchu (TW)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,472

(22) Filed: Nov. 8, 1999

Related U.S. Application Data

(63) Continuation-in-part of application No. 09/118,437, filed on Jul. 17, 1998, now Pat. No. 6,111,673.

(51) Int. Cl.[7] .......................... H04J 14/00; H04J 14/02
(52) U.S. Cl. ...................... 359/124; 359/128; 359/123; 370/392; 370/471; 370/352
(58) Field of Search ................................ 359/123, 124, 359/128, 137; 370/392–393, 471, 474

(56) References Cited

U.S. PATENT DOCUMENTS

| | | | |
|---|---|---|---|
| 4,797,879 A | 1/1989 | Habbab et al. | 359/123 |
| 4,831,616 A | 5/1989 | Huber | 359/137 |
| 5,018,130 A | 5/1991 | Suzuki et al. | 359/124 |
| 5,101,290 A | 3/1992 | Eng et al. | 359/123 |
| 5,337,185 A | 8/1994 | Meier et al. | 359/321 |
| 5,488,501 A | 1/1996 | Barnsley | 359/137 |
| 5,550,818 A | 8/1996 | Brackett et al. | 370/395.51 |
| 5,589,967 A | 12/1996 | Auffret | 359/123 |
| 5,623,356 A | 4/1997 | Kaminow et al. | 359/123 |

(List continued on next page.)

FOREIGN PATENT DOCUMENTS

| | | |
|---|---|---|
| EP | 0702479 | 3/1996 |
| EP | 0949837 | 10/1999 |
| WO | WO 00/44118 | 1/2000 |
| WO | WO 01/35185 | 10/2000 |

OTHER PUBLICATIONS

R.E. Wagner, et al., "MONET: Multi–Wavelength Optical Networking", Journal of Lightwave Technology, vol. 14, No. 6, Jun. 1996.

Chang et al., "Multiwavelength Reconfigurable WDM/ATM/SONET Network Testbed", Journal of Lightwave Technology, vol. 14, No. 6, Jun. 1996.

(List continued on next page.)

*Primary Examiner*—Kinfe-Michael Negash
(74) *Attorney, Agent, or Firm*—John P. O'Banion; Joseph Giordano

(57) ABSTRACT

An optical signaling header technique applicable to optical networks wherein packet routing information is embedded in the same channel or wavelength as the data payload so that both the single-sideband modulated header and data payload propagate through network elements with the same path and the associated delays. The header routing information has sufficiently different characteristics from the data payload so that the signaling header can be detected without being affected by the data payload, and that the signaling header can also be removed without affecting the data payload. The signal routing technique can be overlaid onto the conventional network elements in a modular manner using two types of applique modules. The first type effects header encoding and decoding at the entry and exit points of the data payload into and out of the network; the second type effects header detection at each of[ ]the network elements.

12 Claims, 12 Drawing Sheets

U.S. PATENT DOCUMENTS

| | | | |
|---|---|---|---|
| 5,706,375 A | | 1/1998 | Mihailov et al. ............. 385/24 |
| 5,734,486 A | | 3/1998 | Guillemot et al. .......... 359/139 |
| 5,745,612 A | | 4/1998 | Wang et al. ................... 385/24 |
| 5,838,848 A | | 11/1998 | Laude .......................... 385/24 |
| 5,912,753 A | | 6/1999 | Cotter et al. ................ 359/137 |
| 5,920,663 A | | 7/1999 | Dragone ...................... 385/15 |
| 5,978,119 A | | 11/1999 | Giles et al. ................. 359/132 |
| 5,995,256 A | * | 11/1999 | Fee ............................. 359/125 |
| 6,023,544 A | | 2/2000 | Dragone ...................... 385/37 |
| 6,108,113 A | * | 8/2000 | Fee ............................. 359/124 |
| 6,111,673 A | * | 8/2000 | Chang et al. ............... 359/123 |
| 6,160,651 A | * | 12/2000 | Chang et al. ............... 359/124 |
| 6,271,946 B1 | | 8/2001 | Chang et al. ............... 359/124 |

OTHER PUBLICATIONS

I. P. Kaminow et al., "A Wideband All–Optical WDM Network", IEEE Journal on Selected Areas of Communications, vol. 14, No. 5, Jun. 1996.

N. F. Maxemchuk, "The Manhattan Street Network", Proceedings on IEEE Globecom '85, pp 255–261, Dec. 1985.

A. Budman, E. Eichen, J. Schalafer, R. Olshansky, and F. McAleavey, "Multigigabit Optical Packet Switch for Self–Routing Networks with Subcarrier Addressing", Technical Digest, paper TuO4, pp. 90–91, OFC'92.

W. I. Way, D. A. Smith, J.J. Johnson, H. Izadpanah, and H. Johnson, "Self–routing WDM High–Capacity SONET Ring Network," Technical Digest, paper TuO2, pp. 86–87, OFC'92.

W. I. Way, D. A. Smith, J.J. Johnson, and H. Izadpanah, "A Self–Routing WDM High–Capacity SONET Ring Network," IEEE Photonics Technolgy Letters vol. 4, pp. 402–404, Apr. 1992.

R. T. Hofmeister, L.G. Katzovsky, C.L. Lu, P.Poggiolini, and F. Yang, "CORD: Optical Packet–Switched Network Testbed," Fiber and Integrated Optics, vol. 16, pp. 199–219, 1997.

E. Park and A. E. Willner, "Self–Routing of Wavelength Packets Using an All Optical Wavelength Shifter and QPSK Subcarrier Routing Control," IEEE Photonics Technology Letters, vol. 8, pp. 936–940, Jul. 1996.

M. Shell, M. Vaugh, A. Wang, D.J. Blumenthal, P.J. Rigole, and S. Nilsson, "Experimental Demonstration of an All–Optical Routing Node for Multihop Wavelength Routed Networks," IEEE Photonics Technology Letters, vol. 8, pp. 1391–1393, 1996.

B. H. Wang, K. Y. Yen, and W. I. Way, "Demostration of Gigabit WDMA Networks Using Parallel–Processed Sub–Carrier Hopping Pilot–Tone (P3) Signaling Technique," IEEE Photonics Technology Letters, vol. 8, pp. 933–934, Jul. 1996.

W. Shieh and A. E. Willner, "A Wavelength–Routing Node Using Multifunctional Semiconductor Optical Amplifiers and Multiple–Pilot–Tone–Coded Subcarrier Control Headers", IEEE Photonics Technology Letters, vol. 9, pp. 1268–1270, Sep. 1997.

X. Jiang, X. P. Chen, and A. E. Willner, "All Optical Wavelength Independent Packet Header Replacement Using a Long CW Region Generated Directly from the Packet Flag", IEEE Photonics Technology Letters, vol. 9, pp. 1638–1640, Nov. 1998.

D. J. Blumenthal et al., "WDM Optical Tag Switching with Packet–Rate Wavelength Conversion and Subcarrier Multiplexed Addressing," OFC 1999, Conference Digest, pp. 162–164.

Blumenthal, D.J. et al.; "WDM Optical IP Tag Switching with Packet–Rate Wavelength Conversion and Subcarrier Multiplexed Addressing," OFC 1999, Conference Digest, pp. 162–164, 1999.

Lee, J. et al.; "Secure Communication Using Chaos," Globecom 1995, pp. 1183–1187, Singapore, Nov. 14–16, 1995.

Bennett, Charles H., "Experimental Quantum Cryptography," Journal of Cryptology, vol. 5, pp. 3 thrue 28, (1992).

Faist, J. et al.; "High–Power Continuous–Wave Quantum Cascade Lasers," IEEE Journal of Quantum Electronics, vol. 34, No. 2, pp. 336–343, Feb, 1998.

Guillemot, Christian; "Optical Packet Switching for SDM High Speed Backbones," Power Point Presentation at 24th European Conference on OPtical Communication, Madrid, Spain, pp. 1–43 Sep. 20–24, 1998.

Gambini, Piero et al.; "Transparent Optical Packet Switchinf: Network Architecture and Demonstrators in the KEOPS Project," IEEE Journal on Selected Areas in Communications, vol. 16, No. 7, pp. 1245–1259, Sep. 1998.

Hunter, David K.; "Waspnet: A Wavelength Switched Packet Network," IEEE Communications Magazine, pp. 120–129, Mar., 1999.

Kato, K. et al.; "32 x 32 Full–Mesh (1024 Path) Wavelength–Routing WDM Network Based on Uniform Loss Cyclic Frequency Arrayed–Waveguide Grating," Electronics Letters, vol. 36, No. 15, pp. 1294–1296, Jul. 20, 2000.

Takada, K. et al.; "480 Channel 10 GHz Spaced Multi–Demultiplexer," Electronics Letters, vol. 35, No. 22, pp. 1964–1966, Oct. 28, 1999.

Neber, S. et al.; "Tunable Laser Diodes with Type II Superlattice in the Tuning Region," Semiconductor Science Technology, vol. 13, pp. 801–805, 1998.

Chan, M. et al.; "The Effect of Carrier–Induced Change on the Optical Properties of AlGaAs–GaAs Intermixed Quantum Wells," IEEE Journal on Selected Topics in Quantum Electronics, vol. 4, No. 4, pp. 685–694, Jul/Aug., 1998.

Shim, J. et al.; "Refractive Index and Loss Changes Produced by Current Injection in InGaAs(P)InGaAs Multiple Quantum–We;ll (MQW) Waveguides," IEEE Journal on Selected Topics in Quantum Electronics, vol. 1, No. 2, pp. 408–415, Jun. 1995.

Mason, B. et al.; "Widely Tunable Samples Grating DBR Laser with Integrated Electroabsorption Modulator," IEEE Photonics Technology Letters, vol. 11, No. 6, pp. 638–640, Jun. 1999.

* cited by examiner

HIGH-THROUGHPUT, LOW-LATENCY NEXT GENERATION INTERNET NETWORKS USING OPTICAL LABEL SWITCHING AND HIGH-SPEED OPTICAL HEADER GENERATION, DETECTION AND REINSERTION

CROSS-REFERENCE TO RELATED APPLICATION

This application is a continuation-in-part of application Ser. No. 09/118,437 filed Jul. 17, 1998, now U.S. Pat. No. 6,111,673.

BACKGROUND OF THE DISCLOSURE

1. Field of the Invention

This invention relates to optical communication systems and, more particularly, to an optical system which accommodates network traffic with high throughput and low latency and effects high-speed header detection and generation.

2. Description of the Background Art

Recent research advances in optical Wavelength Division Multiplexing (WDM) technology have fostered the development of networks that are orders of magnitude higher in transmission bandwidth than existing commercial networks. While such an increase in throughput is impressive on its own, a corresponding decrease in network latency must also be achieved in order to realize the Next Generation Internet (NGI) vision of providing the next generation of ultra high speed networks that can meet the requirements for supporting new applications, including national initiatives. Towards this end, current research efforts have focused on developing an ultra-low latency Internet Protocol (IP) over WDM optical packet switching technology that promises to deliver the two-fold goal of both high throughput with low latency. Such efforts, while promising, have yet to fully realize this two-fold goal.

There are a number of challenging requirements in realizing such IP/WDM networks. First, the NGI network must inter-operate with the existing Internet and avoid protocol conflicts. Second, the NGI network must provide not only ultra low-latency, but must take advantage of both packet-switched (that is, bursty) IP traffic and circuit-switched WDM networks. Third, it is advantageous if the NGI network does not depend upon precise synchronization between signaling and data payload. Finally, a desired objective is that the NGI network accommodates data traffic of various protocols and formats so that it is possible to transmit and receive IP as well as non-IP signals without the need for complicated synchronization or format conversion.

Comparison With Other Work

The Multi-Wavelength-Optical Network (MONET) system, as reported in the article "MONET: Multi-Wavelength Optical Networking" by R. E. Wagner, et al. and published in the Journal of Lightwave Technology, Vol. 14, No. 6, June 1996, demonstrated a number of key milestones in optical networks including transparent transmission of multi-wavelength through more than 12 reconfigurable network elements spread over the national scale fiber distance. The network, however, is circuit-switched and suffers inefficiency in accommodating bursty traffic. The typical connection setup time from request to switching is a few seconds, limited by capabilities of both Network Control & Management (NC&M) and hardware. Recent efforts within the MONET program to improve on the efficiency concentrated on the "Just-in-Time signaling" scheme. This method utilizes embedded 1510 nm NC&M signaling which precedes the data payload by an estimated delay time. This estimation must be accurately made for each network configuration for every wavelength in order to synchronize the signaling header and switching of the payload.

In accordance with the present invention, the optical packet header is carried over the same wavelength as the packet payload data. This approach mitigates the issue of header and payload synchronization. Furthermore, with a suitable use of optical delay at each intermediate optical switch, it eliminates the need to estimate the initial burst delay by incorporating the optical delay directly at the local switches. This makes a striking difference with Just-In-Time signaling in which the delay at each switch along the path needs to be known ahead of time and must be entered in the calculation for the total delay. Lastly, there is little time wasted in requesting a connection time and actually achieving a connection. In comparison to a few second delays seen in MONET, the present inventive subject matter reduces the delay to minimal, only limited by the actual hardware switching delays at each switch. The current switching technology realizes delays of only several microseconds, and shorter delays will be possible in the future. Such a short delay can be incorporated by using an optical fiber delay line at each network element utilizing switches. The present inventive subject matter achieves the lowest possible latency down to the fundamental limit of the hardware, and no lower latency can be achieved by any other technique.

The Optical Networks Technology Consortium (ONTC) results were reported in the article "Multiwavelength Reconfigurable WDM/ATM/SONET Network Testbed" by Chang et al. and published in the Journal of Lightwave Technology, Vol. 14, No. 6, June 1996. Both Phase I (155 Mb/s, 4-wavelength) and Phase II (2.5 Gb/s, 8-wavelength) of the ONTC program were configured on a Multihop ATM-based network. While such an ATM based architecture added a large overhead and excluded the possibility of a single-hop network, the packet/header signaling was made possible by utilizing the isochronous ATM cell itself. This communication of NC&M information is made through the same optical wavelength, potentially offering similar benefits as with the technique of the present invention However, the inventive technique offers a number of significant advantages over the ATM-based signaling. First, the inventive technique offers a single hop connection for the payload without the need to convert to electrical signals and buffer the packets. Second, it offers far more efficient utilization of the bandwidth by eliminating excessive overheads. Third, it allows strictly transparent and ultra-low latency connections.

The DARPA sponsored All-Optical-Network (AON) Consortium results were reported in an article entitled "A Wideband All-Optical WDM Network", by I. P. Kaminow et al. and published in the IEEE Journal on Selected Areas of Communication, Vol. 14, No. 5, June, 1996. There were actually two parts of the AON program: WDM as reported in the aforementioned article, and TDM reported in a companion paper in the same issue. First the WDM part of the AON program is first discussed, followed by the TDM part.

The AON architecture is a three-level hierarchy of subnetworks, and resembles that of LANs, MANs, and WANs seen in computer networks. The AON provides three basic services between Optical Terminals (OTs): A, B, and C services. A is a transparent circuit-switched service, B is a transparent time-scheduled TDM/WDM service, and C is a non-transparent datagram service used for signaling. The B service uses a structure where a 250 microsecond frame is used with 128 slots per frame. Within a slot or group of slots, a user is free to choose the modulation rate and format. The B-service implemented on the AON architecture is closest to the IP over WDM, which is the subject matter of the present invention. However, the separation of NC&M signaling in the C-service with the payload in the B-service requires careful synchronization between the signaling header and the payload. This requirement becomes far more stringent as the 250 microsecond frame is used with 128 slots per frame with arbitrary bit rates. Not only the synchronization has to occur at the bit level, but this synchronization has to be achieved across the entire network. The scalability and interoperability are extremely difficult since these do not go in steps with the network synchronization requirement. The present inventive subject matter requires only that the payload and the header are transmitted and received simultaneously, inter-operates with existing IP and non-IP traffic, and offers scalability.

TDM efforts are aimed at 100 Gb/s bit rates. In principle, such ultrafast TDM networks have the potential to provide truly flexible bandwidth on demand at burst rates of 100 Gb/s. However, there are significant technological challenges behind such high bit rate systems mainly related to nonlinearities, dispersion, and polarization degradations in the fiber. While the soliton technologies can alleviate some of the difficulties, it still requires extremely accurate synchronization of the network—down to a few picoseconds. In addition, the header and the payload must have the identical bit rates, and as a consequence, bit-rate transparent services are difficult to provide. The subject matter in accordance with the present invention does not depend on precise synchronization, relies on no 100 Gb/s technologies, and offers transparent services.

The Cisco Corporation recently announced a product based on Tag-Switching and the general description of Cisco's Tag-Switching is available at the world-wide-web site, (http://www.cisco.com/warp/public/732/tag/). Cisco's (electronic) Tag Switching assigns a label or "tag" to packets traversing a network of routers and switches. In a conventional router network, each packet must be processed by each router to determine the next hop of the packet toward its final destination. In an (electronic) Tag Switching network, tags are assigned to destination networks or hosts. Packets then are switched through the network with each node simply-swapping tags rather than processing each packet. An (electronic) Tag Switching network will consist of a core of (electronic) tag switches (either conventional routers or switches), which connect to (electronic) tag edge routers on the network's periphery. (Electronic) Tag edge routers and tag switches use standard routing protocols to identify routes through the network. These systems then use the tables generated by the routing protocols to assign and distribute tag information via a Tag Distribution Protocol. Tag switches and tag edge routers receive the Tag Distribution Protocol information and build a forwarding database. The database maps particular destinations to the tags associated with those destinations and the ports through which they are reachable.

When a tag edge router receives a packet for forwarding across the tag network, it analyzes the network-layer header and performs applicable network layer services. It then selects a route for the packet from its routing tables, applies a tag and forwards the packet to the next-hop tag switch.

The tag switch receives the tagged packet and switches the packet based solely on the tag, without re-analyzing the network-layer header. The packet reaches the tag edge router at the egress point of the network, where the tag is stripped off and the packet delivered. After Cisco made its announcement about (Electronic) Tag Switching, the IETF (Internet Engineering Task Force) has recommended a MPLS (Multi-protocol Label Switching) to implement standardized, vendor-neutral (electronic) tag-switching function in routers and switches, including ATM switches.

A number of features in the Cisco's (electronic) Tag Switching is similar to the Optical Tag Switching which is the subject matter of the present invention, with the features aimed at the similar goals of simplifying the processing required for packet routing. The key differences are as follows. First, the optical tag switching is purely optical in the sense that both tag and data payload are in an optical form. While each plug-and-play module (a component of the present inventive system) senses the optical tag, the actual packet does not undergo optical-to-electrical conversion until it comes out of the network. The Cisco's (electronic) Tag Switching will be all electrical, and applies electronic detection, processing, and retransmission to each packet at each router. Secondly, the Optical Tag Switching of the present invention achieves lowest possible latency and does not rely on utilizing buffers. Electronic tag switching will have far greater latency due to electronic processing and electronic buffering. Thirdly, the Optical Tag Switching of the present invention utilizes path deflection and/or wavelength conversion to resolve blocking due to contention of the packets, whereas the Electronic Tag Switching will only utilize electronic buffering as a means to achieve contention resolution at the cost of increased latency, and the performance is strongly dependent on packet size. The present invention covers packets of any length. Lastly, the Optical Tag Switching of the present invention achieves a strictly transparent network in which data of any format and protocol can be routed so long as it has a proper optical tag. Hence the data can be digital of any bit rate and modulation formats. The Electronic Tag Switching requires that data payload to have the given digital bit rate identical to the electronic tag since the routers must buffer them electronically.

Another representative technology that serves as background to the present invention is the so-called Session Deflection Virtual Circuit Protocol (SDVC), which is based on a deflection routing method. The paper entitled "The Manhattan Street Network", by N. F. Maxemchuk" as published in the Proceedings on IEEE Globecom '85, pp 255–261, December 1985, discusses that when two packets attempt to go to the same destination, one packet can be randomly chosen for the preferred output link and the other packet is "deflected" to the non-preferred link. This means that packets will occasionally take paths that are not shortest paths. The deflection method utilized by the present invention does not 'randomly' select the packet to go to the most preferred path, rather, it attempts to look into the priorities of the packets, and send the higher priority packet to be routed to the preferred path. The packets will be deflected if they have lower priorities; however, both 'path deflection' and 'wavelength deflection' are utilized. The path deflection is similar to conventional SDVC in that the optical packet will be simply routed to the path of the next preference at the same wavelength. The wavelength deflection allows the optical packet to be routed to the most preferred path but at a different wavelength. This wavelength deflection is achieved by wavelength conversion at the network elements. Partially limited wavelength conversion is utilized, meaning not all wavelengths will be available as destination wavelengths for a given originating wavelength. The wavelength deflection allows resolution of blocking due to wavelength contentions without increasing the path delay. The combination of path and wavelength deflections offers sufficiently large additional connectivities for resolving packet contentions; however, the degree of partial wavelength conversion can be increased when the blocking rate starts to rise. Such scalability and flexibility of the network are not addressed by conventional SDVC.

Besides the foregoing overall system considerations elucidated above, there is also the issue of how to effectively detect and/or re-insert a header which is combined with a data payload for propagation over the network using the same optical wavelength. The primary focus in the literature has been on a technique for combining sub-carrier headers with a baseband data payload. The very first two articles addressing this issued were published in 1992 by A. Bidman et. al., who combined a 2.56 Gb/s data payload with a 40 Mb/s header on 3 GHz carrier [A. Budman, E. Eichen, J. Schalafer, R. Olshansky, and F. McAleavey, "Multigigabit optical packet switch for self-routing networks with subcarrier addressing," Techical Digest, paper TuO4, pp. 90–91, OFC'92], and W. I. Way et al., who combined a 2.488 Gb/s data payload with a tunable microwave pilot tone (tuned between 2.520 and 2.690 GHz) to route SONET packet in a WDM ring network via acousto-optical tunable filter [W. I. Way, D. A. Smith, J. J. Johnson, H. Izadpanah, and H. Johnson, "Self-routing WDM high-capacity SONET ring network," Technical Digest, paper TuO2, pp. 86–87, OFC'92, and W. I. Way, D. A. Smith, J. J. Johnson, and H. Izadpanah, "A self-routing WDM high-capacity SONET ring network," IEEE Photonics Technology Letters, vol. 4, pp. 402–404, April 1992.2,3]. Both of these articles used a single laser diode to carry the data payload and sub-carrier header. This technique has also been extensively studied in a local-area DWDM optical packet-switched network [R. T. Hofmeister, L. G. Katzovsky, C. L. Lu, P. Poggiolini, and F. Yang, "CORD: optical packet-switched network testbed," Fiber and Integrated Optics, vol. 16, pp. 199–219, 1997], and several other all-optical networks [E. Park and A, E. Wiltner, "Network demonstration of self-routing wavelength packets using an all-optical wavelength shifter and QPSK subcarrier routing control," IEEE Photonics Technology Letters, vol. 8, pp. 938–940, 1996; and M. Shell, M. Vaughn, A. Wang, D. J. Blumenthal, P. J. Rigole, and S. Nilsson, "Experimental demonstration of an all-optical routing node for multihop wavelength routed networks," IEEE Photonic Technology Letters, vol. 8, pp. 1391–1393, 1996].

Instead of combing a sub-carrier header with the data payload in the electrical domain, they have also been combined in the optical domain by using two laser diodes at different wavelengths [B. H. Wang, K. Y. Yen, and W. I. Way, "Demonstration of gigabit WDMA networks using parallel-processed sub-carrier hopping pilot-tone ($p^3$) signaling technique," IEEE Photonics Technology Letters, vol. 8, pp. 933–934, July 1996].

However, using two wavelengths to transport data payload and header separately may not be practical in the following sense: in an all-optical DWDM network, it is preferred that the header, which may contain network operations information, travels along the same routes as data payload so that it can truthfully report the updated status of the data payload. If the header and the data payload were carried by different wavelengths, they could be routed in the network with entirely different paths, and the header may not report what the data payload has really experienced. Therefore, although it is preferred that the sub-carrier header and the data payload be carried by the same wavelength, the art is devoid of such teachings and suggestions.

The sub-carrier pilot-tone concept presented in Wang et al. was extended to multiple pilot tones by Shieh et al. [W. Shieh and A. E. Wilner, "A wavelength routing node using multifunctional semiconductor optical amplifiers and multiple-pilot-tone-coded subcarrier control headers," IEEE Photonics Technology Letters, vol. 9, pp. 1268–1270, September 1997.], mainly for the purpose of increasing the number of network addresses.

Recently, consideration has been given to 'header replacement' for the high-throughput operation in a packet-switched network in which data paths change due to link outages, output-port contention, and variable traffic patterns. Moreover, header replacement could be useful for maintaining protocol compatibility at gateways between different networks. However, the only method which has been reported is for time-division-multiplexed header and data payload requires an extremely high accuracy of timing synchronization among network nodes [X. Jiang, X. P. Chen, and A. E. Willner, "All optical wavelength independent packet header replacement using a long CW region generated directly from the packet flag," IEEE Photonics Technology Letters, vol. 9, pp. 1638–1640, November 1998].

Most recently, Blumenthal et al., in an article entitled "WDM Optical Tag Switching with Packet-Rate Wavelength Conversion and Subcarrier Multiplexed Addressing", OFC 1999, Conference Digest, pages 162–164, report experimental results of all-optical IP tag switching for WDM switched networks. However, the experimental system is a non-burst system and, moreover, no propagation of the resultant signal over actual fiber is discussed. It is anticipated that the propagation distance will be substantially limited whenever the system is deployed with optical fiber because of phase dispersion effects in the optical fiber.

From this overview of the art pertaining to details of header generation and detection, it is readily understood that the art is devoid of teachings and suggestions wherein sub-carrier multiplexed packet data payload and multiple sub-carrier headers (including old and new ones) are deployed so that a >2.5 Gbps IP packet can be routed through a national all-optical DWDM network by the (successive) guidance of these sub-carrier headers, with the total number of sub-carrier headers that can be written is in the range of forty or more.

SUMMARY OF THE INVENTION

The present invention utilizes a unique optical signaling header technique applicable to optical networks. Packet routing information is embedded in the same channel or wavelength as the data payload so that both the header and data information propagate through the network with the same path and the associated delays. However, the header routing information has sufficiently different characteristics from the data payload so that the signaling header can be detected without being affected by the data payload and that the signaling header can also be stripped off without affecting the data payload. The inventive subject matter allows such a unique signal routing method to be overlaid onto the conventional network elements in a modular manner, including the insertion, detection and processing of the optical header.

In accordance with one broad method aspect of the present invention commensurate with the overall NGI system, a method for propagating a data payload from an input network element to an output network element in a wavelength division multiplexing system composed of a plurality of network elements, given that the data payload has a given format and protocol, includes the following steps: (a) adding a single-sideband header to the data payload prior to inputting the data payload to the input network element to produce an optical signal, the header having a format and protocol and being indicative of the local route through each of the network elements for the data payload and the header, the format and protocol of the data payload being independent of the format and protocol of the header; and (b) detecting the header at each of the network elements as the data payload and header propagate through the WDM network, wherein the header is conveyed by a distinct carrier frequency such that the single-sideband spectrum of the header occupies a frequency band above the data payload, such that the step of detecting includes (i) opto-electrically converting the optical signal to detect the header, (ii) processing the header to produce a switch control signal to route the incoming optical signal, (iii) optically filtering the optical signal with a reflective part of a notch filter to delete the header and recover the data payload, and (iv) inserting a new single-sideband header at the given frequency band into the optical signal in place of the deleted header.

In accordance with a broad system aspect of the present invention commensurate with the overall NGI system, a system for propagating a data payload from an input network element to an output network element in a wavelength division multiplexing system composed of a plurality of network elements, given that the data payload has a given format and protocol, includes: (a) an adder for adding a single-sideband header to the data payload prior to inputting the data payload to the input network element to produce an optical signal, the header having a format and protocol and being indicative of the local route through each of the network elements for the data payload and the header, the format and protocol of the data payload being independent of the format and protocol of the header; and (b) a detector for detecting the header at each of the network elements as the data payload and header propagate through the WDM network, wherein the header is conveyed by a distinct carrier frequency such that the single-sideband spectrum of the header occupies a frequency band above the data payload, such that system further includes (i) an opto-electrical converter for detecting the optical signal to produce the header, (ii) a processor for processing the detected header to produce a switch control signal to route the incoming optical signal, (iii) an optical filter for filtering the optical signal with a reflective part of the notch filter to delete the header and recover the data payload, and (iv) means for inserting a new single-sideband header at the given frequency band into the optical signal in place of the deleted header.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In order to gain an insight into the fundamental principles in accordance with the present invention as well as to introduce terminology useful in the sequel, an overview is first presented, followed by an elucidation of an illustrative embodiment.

Overview

The present invention relates to a network for realizing low latency, high throughput, and cost-effective bandwidth-on-demand for large blocks of data for NGI applications. Cost-effective and interoperable upgrades to the network are realized by interposing portable 'Plug-and-Play' modules on the existing WDM network elements to effect so-called "WDM optical label switching" or, synonymously, "optical label switching". The invention impacts primarily the hardware for the NGI network from the network element design perspective.

As alluded to, the methodology carried out by the network and concomitant circuitry for implementing the network are engendered by a technique called WDM optical label-switching—defined as the dynamic generation of a routing path for a burst duration by an in-band optical signaling header. Data packets are routed through the WDM network using an in-band WDM signaling header for each packet. At a switching node, the signaling header is processed and the header and the data payload (1) may be immediately forwarded through an already existing flow state connection, or (2) a path can be setup for a burst duration to handle the header and the data payload. WDM label-switching enables highly efficient routing and throughput, and reduces the number of IP-level hops required by keeping the packets routing at the optical level to one hop as managed by the Network Control and Management (NC&M) which creates and maintains routing information.

Figure 1:
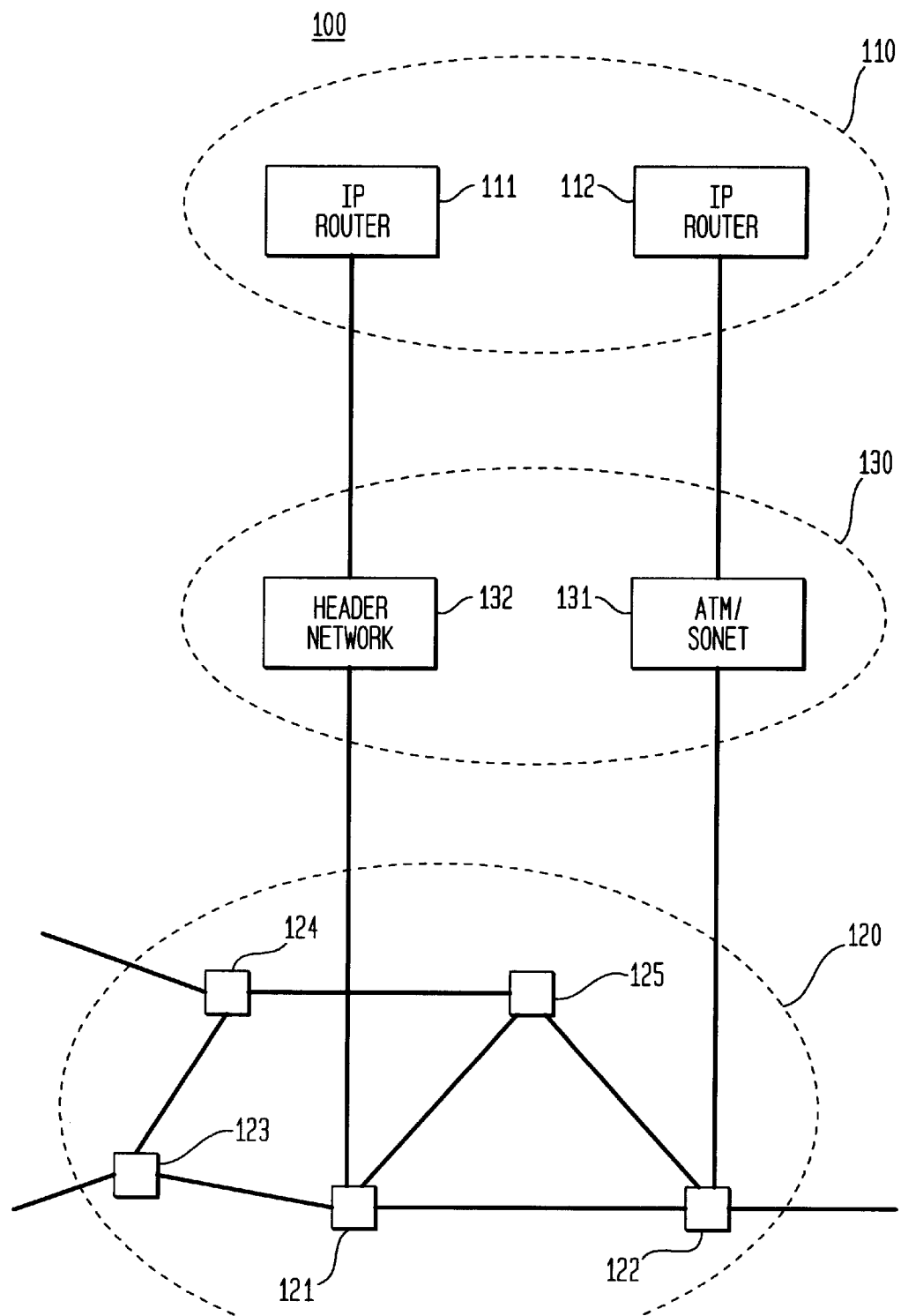
FIG. 1 is a pictorial representation of a general network illustrating the coupling between the optical and electrical layers of the network.

The depiction of FIG. 1 shows the inter-relation between optical layer 120 and electrical layer 110 of generic network 100 as provided by intermediate layer 130 coupling the optical layer and the electrical layer. Electrical layer 110 is shown, for simplicity, as being composed of two conventional IP routers 111 and 112. Optical layer 120 is shown as being composed of network elements or nodes 121–125. Intermediate layer 130 depicts conventional ATM/SONET system 131 coupling IP router 112 to network element 122. Also shown as part of layer 130 is header network 132, which in accordance with the present invention, couples IP router 111 to network element 121. FIG. 1 pictorially illustrates the location of network 132 on a national-scale, transparent WDM-based backbone network with full interoperability and reconfigurability. It is important to emphasize at this point that the elements of FIG. 1 are illustrative of one embodiment in accordance with the present invention; thus, for example, element 111 may, in another embodiment, be an ATM router or even a switch.

Figure 2:
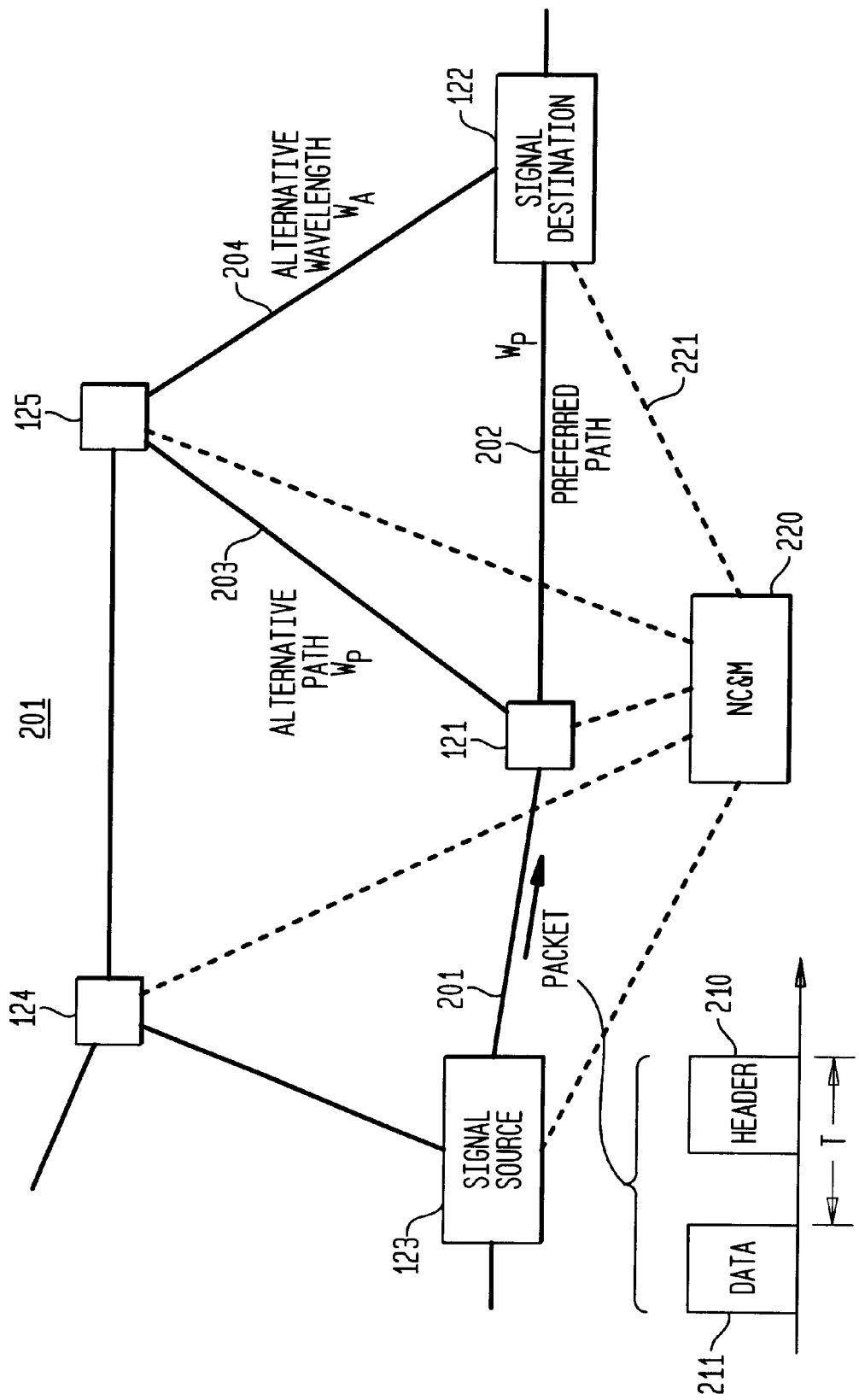
FIG. 2 illustrates the optical layer of the network of FIG. 1 showing the relationship between the optical signal header and data payload, and the use of the header/payload in network setup.

Now with reference to FIG. 2, optical layer 120 of FIG. 1 is shown in more detail including the basic technique, in accordance with the present invention, for setting up a fast connection in optical network 201, composed of network elements 121–125; the setup uses optical signaling header 210 for the accompanying data payload 211. This technique combines the advantages of circuit-switched based WDM and packet-switched based IP technologies. New signaling information is added in the form of an optical signal header 210, which is carried in-band within each wavelength in the multi-wavelength transport environment. Optical signaling header 210 is a label containing routing and control information such as the source, destination, priority, and the length of the packet, propagates and through optical network 201 preceding data payload 211. Each WDM network element 121–125 senses optical signaling header 210, looks-up a connection table (discussed later), and takes necessary steps such as cross-connections, add, drop, or drop-and-continue. The connection table is constantly updated by continuous communication between NC&M 220 and WDM network elements 121–125 through logical connections, such as channel 221. Data payload 211, which follows optical signaling header 210, is routed through a path in each network element (discussed later) as established by the connection. With the arrangement of FIG. 2, there is no need to manage the time delay between optical signaling header 210 and data payload 211, shown by T in FIG. 2, because each network element provides the optical delay needed for the short time required for connection set-up within each network element via delay on an interposed fiber. Moreover, the format and protocol of the data payload is independent of that of the header, that is, for a given network whereas the format and protocol of the header are predetermined, the format and the protocol of the data payload can be the same as or different from those of the header.

Each destination is associated with a preferred path which would minimize 'the cost'—in FIG. 2, the overall path from source 123 to destination 122 includes paths 201 and 202 in cascade, both utilizing wavelength WP. This cost is computed based on the total propagation distance, the number of hops, and the traffic load. The preferred wavelength is defaulted to the original wavelength. For example, the preferred wavelength on path 202 is WP. If this preferred path at the default wavelength is already occupied by another packet, then network element 121 quickly decides if there is an available alternate wavelength WA through the same preferred-path. This alternate wavelength must be one of the choices offered by the limited wavelength conversion in network element 121. If there is no choice of wavelengths which allows transport of the packet through the most preferred path, the next preferred path is selected (path deflection). For example, in FIG. 2, paths 203 and 204 in cascade may represent the alternative path. At this point, the preferred wavelength will default back to the original wavelength WP. The identical process of looking for an alternate wavelength can proceed if this default wavelength is again already occupied. In FIG. 2, path 203 is an alternative path with the same wavelength WP, and path 204 is an alternate path using alternate wavelength WA. In an unlikely case where there is no combination of path and wavelength deflection that can offer transport of the packet, network element 121 will decide to drop the packet of lower priority. In other words, the new packet transport through the preferred path at the originating wavelength takes place by dropping the other packet of the lower priority which is already occupying the preferred path.

Network elements 121–125 are augmented with two types of so-called 'Plug-and-Play' modules to efficiently handle bursty traffic by providing packet switching capabilities to conventional circuit-switched WDM network elements 121–125 whereby signaling headers are encoded onto IP packets and are removed when necessary.

Figure 3:
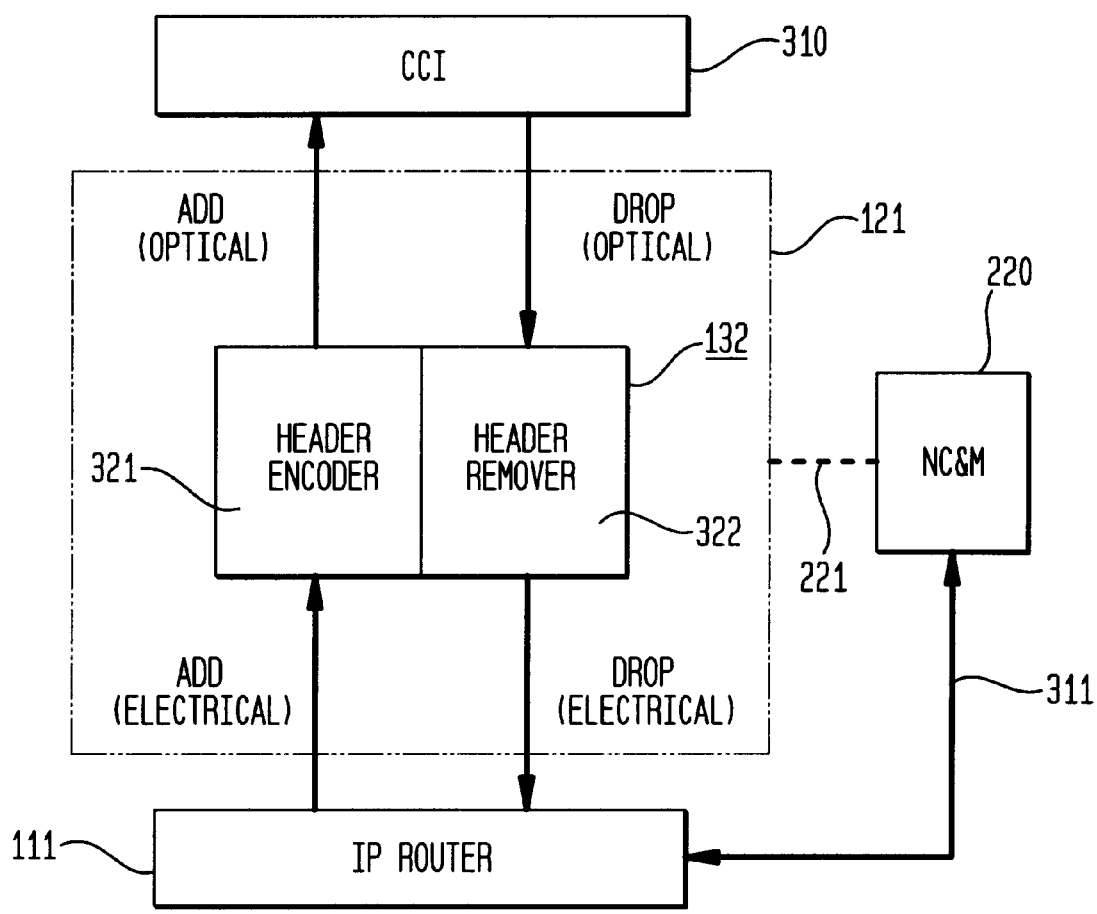
FIG. 3 is a high-level block diagram an optical transmitter in accordance with the present invention for header encoding.

The first type of 'Plug-and-Play' module, represented by electro-optical element 132 of FIG. 1, is-now shown in block diagram form in FIG. 3. Whereas conceptually module 132 is a stand-alone element, in practice, module 132 is integrated with network element 121 as is shown in FIG. 3; module 132 is interposed between compliant client interface (CCI) 310 of network element 121 and IP router 111 to encode optical signaling header 210 onto the packets added into the network via header encoder 321, and to remove optical signaling header 210 from the packets dropping out of the network via header remover 322.

Generally, encoding/removing module 132 is placed where the IP traffic is interfaced into and out of the WDM network, which is between the client interface of the network element and the IP routers. The client interfaces can be either a CCI-type or a non-compliant client interfaces (NCI)-type. At these interfaces, header encoder 321 puts optical header 210 carrying the destination and other information in front of data payload 211 as the IP signal is transported into network 201 is based on the IP signal's original IP address, which is obtained from IP router 111 through interface 311, and. Optical header 210 is encoded in the optical domain by an optical modulator (discussed later). Signaling header remover 322 deletes header 210 from the optical signal dropped via a client interface, and provides an electrical IP packet to IP router 111.

More specifically, module 132 accepts the electrical signal from IP router 111, converts the electrical signal to a desired compliant wavelength optical signal, and places optical header 210 in front of the entire packet. Module 132 communicates with NC&M 220 and buffers the data before optically converting the data if requested by NC&M 220. Module 132 employs an optical transmitter (discussed later) with the wavelength matched to the client interface wavelength. (As indicated later but instructive to mention here, module 132 is also compatible with NCI 404 of FIG. 4 since the wavelength adaptation occurs in the NCI; however, the bit-rate-compatibility of NCI wavelength adaption and the IP signal with optical headers must be established in advance.)

Figure 4:
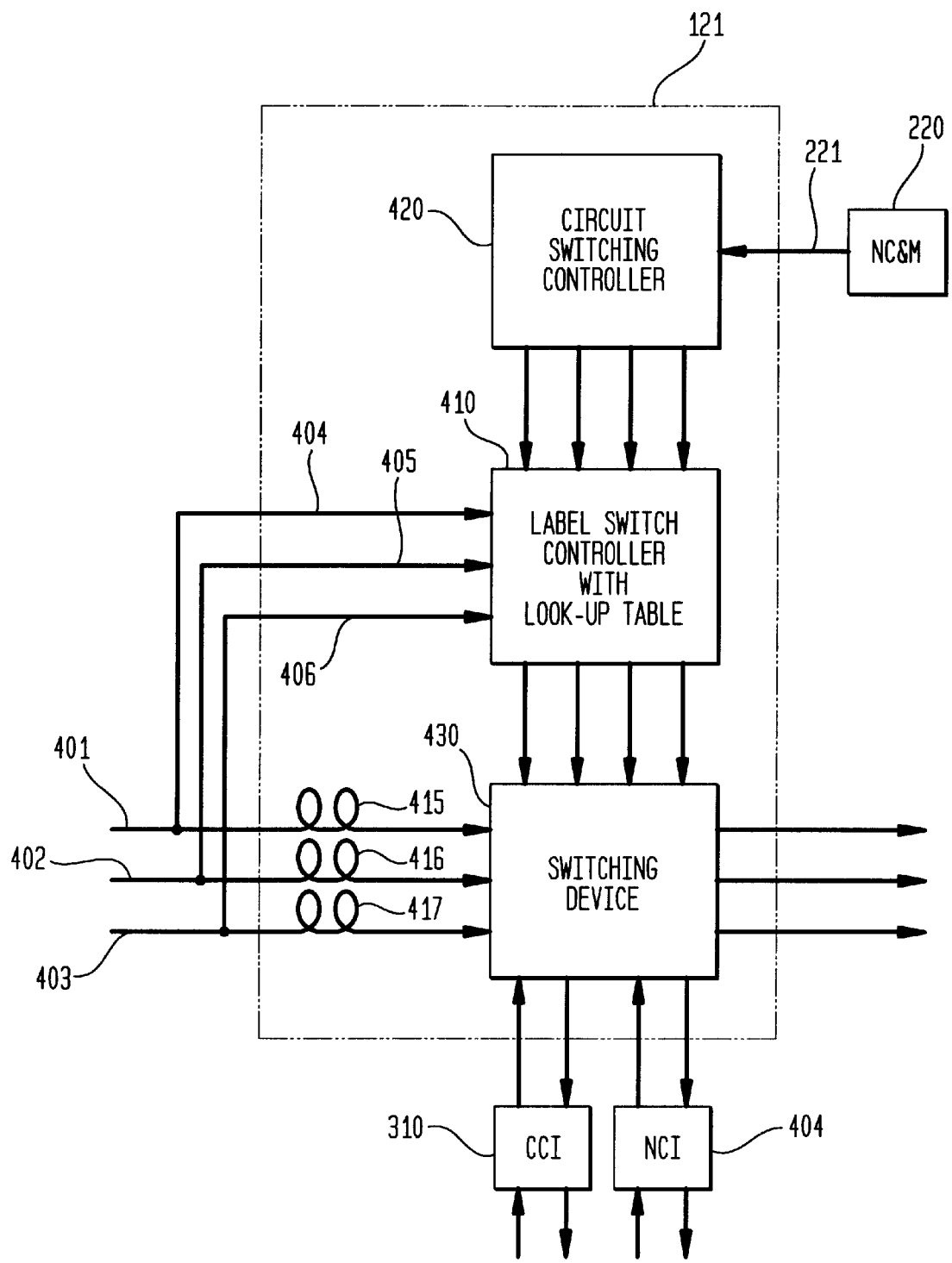
FIG. 4 is a high-level block diagram an optical receiver in accordance with the present invention for header decoding.

FIG. 4 depicts a second type of 'Plug-and-Play' module, optical element 410, which is associated with each WDM network element 121–125, say element 121 for discussion purposes. Module 410 is interposed between conventional network element switch-controller 420 and conventional switching device 430. Module 410 detects information from each signaling header 210 propagating over any fiber 401–403, as provided to module 410 by tapped fiber paths 404–406. Module 410 functions to achieve very rapid table look-up and fast signaling to switching device 430. Switch controller 420 is functionally equivalent to the conventional "craft interface" used for controlling the network elements; however, in this case, the purpose of this switch controller 420 is to accept the circuit-switched signaling from NC&M 220 and determine which control commands are to be sent to label switch controller 410 based on the priority. Thus, label switch controller 410 receives circuit-switched control signals from network element circuit switch controller 420, as well as information as derived from each signaling header 210, and intelligently chooses between the circuit-switched and the label-switched control schemes. The switches (discussed later) comprising switching device 430 also achieve rapid switching. The delay imposed by fibers 415, 416, or 417, which are placed in input paths 401–403 to switching device 430, are such that the delay is larger than the total time it takes to read signaling header 210, to complete a table look-up, and to effect switching. Approximately, a 2 km fiber provides 10 microsecond processing time. The types of WDM network elements represented by elements 121–125 and which encompass switching device 430 include: Wavelength Add-Drop Multiplexers (WADMs); Wavelength Selective Crossconnects (WSXCs); and Wavelength Interchanging Crossconnects (WIXCs) with limited wavelength conversion capabilities.

In operation, module 410 taps a small fraction of the optical signals appearing on paths 401–403 in order to detect information in each signaling header 210, and determine the appropriate commands for switching device 430 after looking up the connection table stored in module 410. The fiber delay is placed in paths 401–403 so that the packet having header 210 and payload 211 reaches switching device 430 only after the actual switching occurs. This fiber delay is specific to the delay associated with header detection, table look-up, and switching, and can typically be accomplished in about 10 microseconds with about 2 km fiber delay in fibers 415–417.

Packets are routed through network 201 using the information in signaling header 210 of each packet. When a packet arrives at a network element, signaling header 210 is read and either the packet (a) is routed to a new appropriate outbound port chosen according to the label routing look-up table, or (b) is immediately forwarded through an already existing label-switching originated connection within the network element. The latter case is referred to as "flow switching" and is supported as part of optical label-switching; flow switching is used for large volume bursty mode traffic.

Label-switched routing look-up tables are included in network elements 121–125 in order to rapidly route the optical packet through the network element whenever a flow switching state is not set-up. The connection set-up request conveyed by optical signaling header 210 is rapidly compared against the label-switch routing look-up table within each network element. In some cases, the optimal connections for the most efficient signal routing may already be occupied. The possible connection look up table is also configured to already provide an alternate wavelength assignment or an alternate path to route the signal. Providing a limited number of (at least one) alternative wavelength significantly reduces the blocking probability. The alternative wavelength routing also achieves the same propagation delay and number of hops as the optimal case, and eliminates the difficulties in sequencing multiple packets. The alternate path routing can potentially increase the delay and the number of hops, and the signal-to noise-ratio of the packets are optically monitored to eliminate any possibility of packets being routed through a large number of hops. In the case where a second path or wavelength is not available, contention at an outbound link can be settled on a first-come, first-serve basis or on a priority basis. The information is presented to a regular IP router and then is reviewed by higher layer protocols, using retransmission when necessary.

Routing Example

Figure 5:
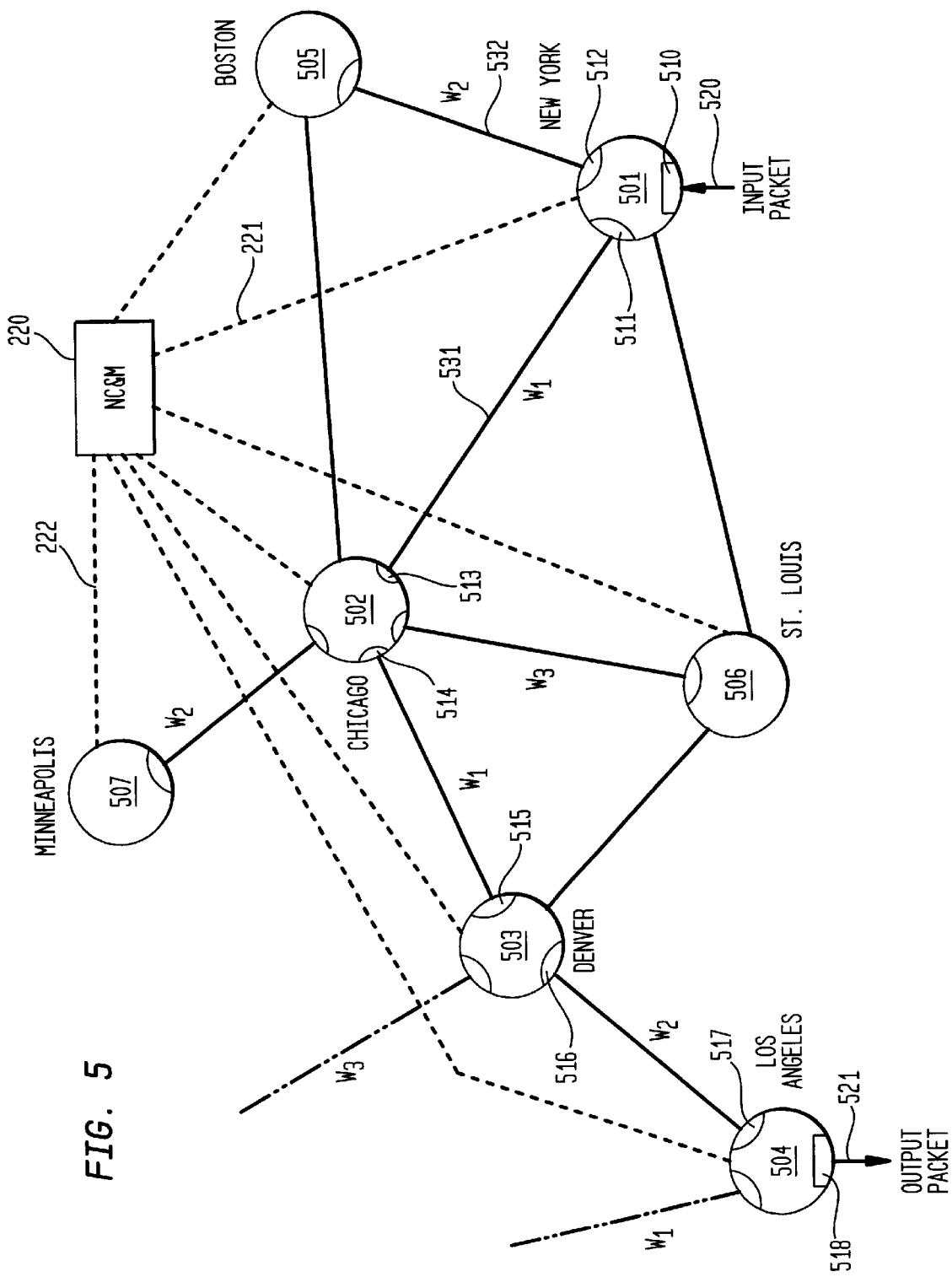
FIG. 5 is illustrative of a WDM circuit-switched backbone network.

An illustrative WDM circuit-switched backbone network 500 for communicating packets among end-users in certain large cities in the United States is shown in pictorial form in FIG. 5—network 500 is first discussed in terms of its conventional operation, that is, before the overlay of WDM optical label switching in accordance with the present invention is presented.

With reference to FIG. 5, it is supposed that New York City is served by network element 501, Chicago is served by network element 502, . . . Los Angeles is served by network element 504, . . . , and Minneapolis by network element 507. (Network elements may also be referred to as nodes in the sequel.) Moreover, NC&M 220 has logical connections (shown by dashed lines, such as channel 221 to network element 501 and channel 222 to network element 507) to all network elements 501–507 via physical layer optical supervisory channels; there is continuous communication among NC&M 220 and network elements 501–507. NC&M 220 periodically requests and receives information about: (a) the general state of each network element (e.g., whether it is operational or shut down for an emergency); (b) the optical wavelengths provided by each network element (e.g., network element 501 is shown as being served by optical fiber medium 531 having wavelength W1 and optical fiber medium 532 having wavelength W2 which connect to network elements 502 (Chicago) and 505 (Boston), respectively); and (c) the ports which are served by the wavelengths (e.g., port 510 of element 501 is associated with an incoming client interface conveying packet 520, port 511 is associated with W1 and port 512 is associated with W2, whereas port 513 of element 502 is associated with W1).

Thus, NC&M 220 has stored at any instant the global information necessary to formulate routes to carry the incoming packet traffic by the network elements. Accordingly, periodically NC&M 220 determines the routing information in the form of, for example, global routing tables, and downloads the global routing tables to each of the elements using supervisory channels 221, 222, . . . The global routing tables configure the ports of the network elements to create certain communication links. For example, NC&M 220 may determine, based upon traffic demand and statistics, that a fiber optic link from New York City to Los Angeles (network elements 501 and 504, respectively) is presently required, and the link will be composed, in series, of: WI coupling port 511 of element 501 to port 513 in network element 502; W1 coupling port 514 of element 502 to port 515 of element 503; and W2 coupling port 516 of element 503 to port 517 of element 504. Then, input packet 520 incoming to network element 501 (New York City) and having a destination of network element 504 (Los Angeles) is immediately routed over this established link. At network element 504, the propagated packet is delivered as output packet 521 via client interface port 518.

In a similar manner, a dedicated path between elements 506 and 507 (St. Louis and Minneapolis, respectively) is shown as established using W3 between network elements 506 and 502, and W2 between elements 502 and 507.

Links generated in this manner—as based upon the global routing tables—are characterized by their rigidity, that is, it takes several seconds for NC&M 220 to determine the connections to establish the links, to download the connectivity information for the links, and establish the input and output ports for each network element. Each link has characteristics of a circuit-switched connection, that is, it is basically a permanent connection or a dedicated path or "pipe" for long intervals, and only NC&M 220 can tear down and re-establish a link in normal operation. The benefit of such a dedicated path is that traffic having an origin and a destination that maps into an already-established dedicated path can be immediately routed without the need for any set-up. On the other hand, the dedicated path can be, and most often is, inefficient in the sense that the dedicated path may be only used a small percentage of the time (e.g., 20%–50% over the set-up period). Moreover, switching device 430 (see FIG. 4), embedded in each network element which interconnects input and output ports, has only a finite number of input/output ports. If the above scenario is changed so that link from St. Louis to Minneapolis is required and a port already assigned to the New York to Los Angeles link is to be used (e.g., port 514 of network element 502), then there is a time delay until NC&M 220 can respond and alter the global routing tables accordingly.

Now the example is expanded so that the subject matter in accordance with the principles of the present invention is overlaid on the above description. First, a parameter called the "label-switched state" is introduced and its use in routing is discussed; then, in the next paragraph, the manner of generating the label-switch state is elucidated. The label-switch state engenders optical label switching.

Figure 6:
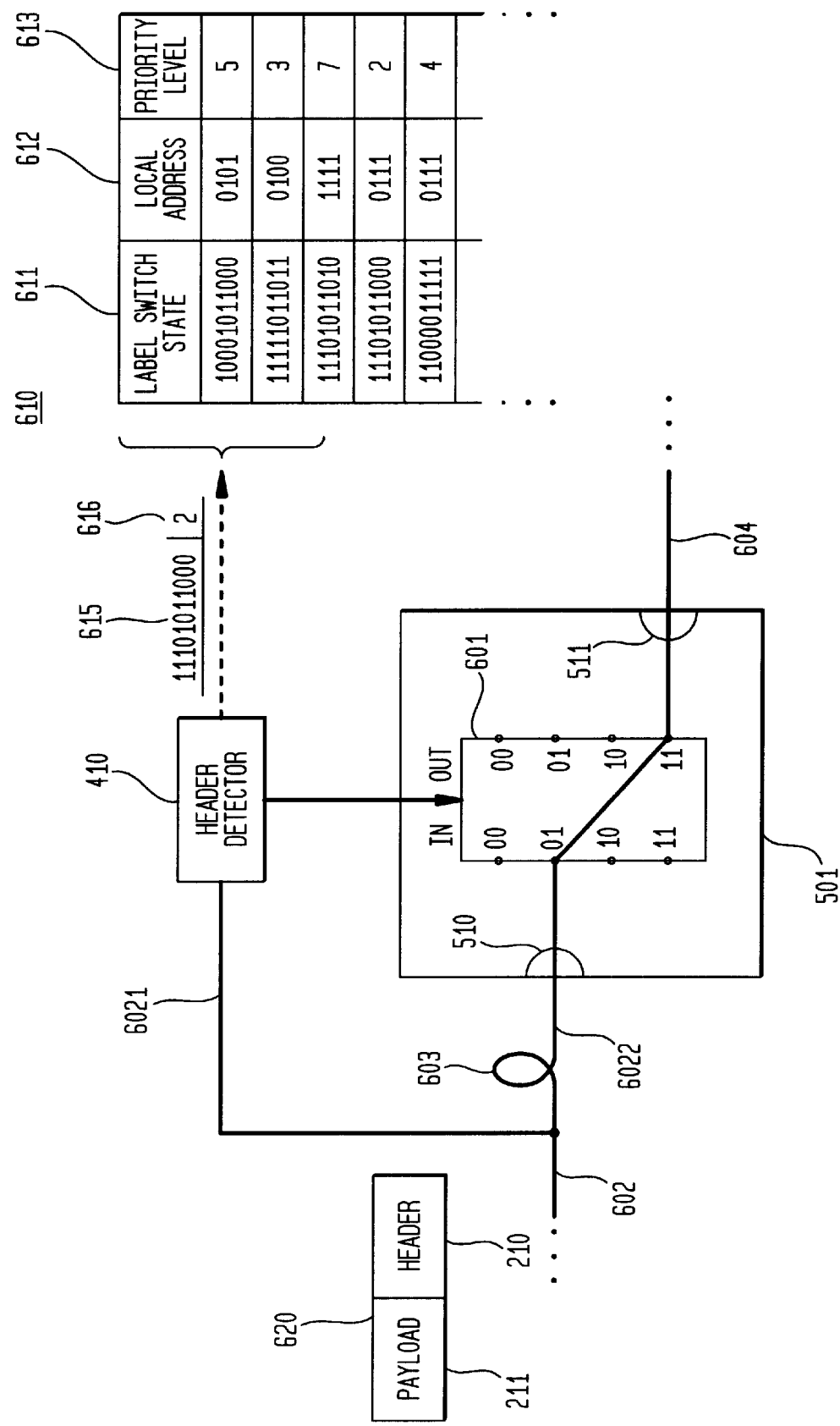
FIG. 6 illustrates a network element of FIG. 1 with its embedded switch and the use of local routing tables.

NC&M 220 is further arranged so that it may assign the label-switch state to each packet incoming to a network element from a client interface—the label-switch state is appended by Plug & Play module 132 and, for the purposes of the present discussion, the label-switch state is commensurate with header 210, (see FIG. 2). The label-switch state is computed by NC&M 220 and downloaded to each network element 501–507 in the form of a local routing table. With reference to FIG. 6, there is shown network element 501 and its embedded switch 601 in pictorial form. Also shown is incoming optical fiber 602, with delay loop 603, carrying packet 620 composed of header 210 and payload 211—payload 211 in this case is packet 520 from FIG. 5. Fiber 6022 delivers a delayed version of packet 620 to network element 501. Also, a portion of the light energy appearing on fiber 602 is tapped via fiber 6021 and inputted to optical module 410 which processes the incoming packet 620 to detect header 210—header 210 for packet 620 is shown as being composed of the label-switch state '11101011000', identified by reference numeral 615. Also shown in FIG. 6 is local look-up table 610, being composed of two columns, namely, "Label-switch State" (column 611), and "Local Address" (column 612). The particular label-switch state for packet 620 is cross-referenced in look-up table 610 to determine the routing of the incoming packet. In this case, the label-switch state for packet 620 is the entry in the fourth row of look-up table 610. The local switch address corresponding to this label-switch state is "0111", which is interpreted as follows: the first two binary digits indicate the incoming port, and the second two binary digits indicate the output port. In this case, for the exemplary four-input, four-output switch, the incoming packet is to be routed from input port "0" to output port "11", so switch 601 is switched accordingly (as shown). After the delay provided by fiber delay 603, the incoming packet on fiber 6022 is propagated onto fiber 604 via switch 601.

The foregoing description of label-switch state indicates how it is used. The manner of generating the label-switch state is now considered. NC&M 220, again on a periodic basis, compiles a set of local look-up tables for routing/switching the packet through each corresponding network element (such as table 610 for network element 501), and each look-up table is then downloaded to the corresponding network element. The generation of each look-up table takes into account NC&M 220's global knowledge of the network 500. For instance, if incoming packet 620 to network 501 is destined for network 504 (again, New York to Los Angeles), if port 510 is associated with incoming port "01," and serves fiber 602, and if outgoing port 511 is associated with outgoing port "11" and serves fiber 604, then NC&M 220 is able to generate the appropriate entry in look-up table 610 (namely, the fourth row) and download table 610 to network element 510. Now, when packet 520 is processed by electro-optical module 132so as to add header 210 to packet 520 to create augmented packet 620, NC&M 220's knowledge of the downloaded local routing tables as well as the knowledge of the destination address embedded in packet 520 as obtained via module 132 enables NC&M 220 to instruct module 132 to add the appropriate label-switch state as header 210—in this case '11101011000'.

It can be readily appreciated that processing a packet using the label-switch state parameter is bursty in nature, that is, after switch 601 is set-up to handle the incoming label-switch state, switch 601 may be returned to its state prior to processing the flow state. For example, switch 601 may have interconnected input port '01' to output port '10' prior to the arrival of packet 620, and it may be returned to the '0110' state after processing (as determined, for example, by a packet trailer). Of course, it may be that the circuit-switched path is identical to the label-switch state path, in which case there is no need to even modify the local route through switch 601 for processing the label-switch state. However, if it is necessary to temporarily alter switch 601, the underlying circuit-switched traffic, if any, can be re-routed or re-sent.

As discussed so far, label switching allows destination oriented routing of packets without a need for the network elements to examine the entire data packets. New signaling information—the label—is added in the form of optical signal header 210 which is carried in-band within each wavelength in the multi-wavelength transport environment. This label switching normally occurs on a packet-by-packet basis. Typically, however, a large number of packets will be sequentially transported towards the same destination. This is especially true for bursty data where a large block of data is segmented in many packets for transport. In such cases, it is inefficient for each particular network element to carefully examine each label and decide on the routing path. Rather, it is more effective to set up a "virtual circuit" from the source to the destination. Header 210 of each packet will only inform continuation or ending of the virtual circuit, referred to as a flow state connection. Such an end-to-end flow state path is established, and the plug-and-play modules in the network elements will not disrupt such flow state connections until disconnection is needed. The disconnection will take place if such a sequence of packets have come to an end or another packet of much higher priority requests disruption of this flow state connection.

The priority aspect of the present invention is also shown with respect to FIG. 6. The local look-up table has a "priority level" (column 613) which sets forth the priority assigned to the label-switching state. Also, header 210 has appended priority data shown as the number '2' (reference numeral 616). Both the fourth and fifth row in the "label-switch state" column 611 of table 610 have a local address of '0111.' If an earlier data packet used the entry in the fifth row to establish, for example, a virtual circuit or flow switching state, and the now another packet is processed as per the fourth row of column 611, the higher priority data ('2' versus '4', with '1' being the highest) has precedent, and the virtual circuit would be terminated.

Detailed Illustrative Embodiments

In order to achieve ultra-low latency IP over WDM label switching, processing of the optical header at each optical switch must be kept to a minimum during the actual transmission of the optical packet. To achieve this end, a new signaling architecture and packet transmission protocol for performing optical WDM label switching is introduced.

The signaling and packet transmission protocols decouple the slow and complex IP routing functions from the ultra-fast WDM switching and forwarding functions. This decoupling is achieved via the setup of an end-to-end routing path which needs to be performed very infrequently. To send IP packets from a source to a destination, the following step is executed in accordance with the present invention: optical packet transmission, where the arrival of the optical packet triggers the local header processing which among other things looks up the output port for forwarding the packet on to the next hop based on the optical label inside the optical header.

Although routing path setup involves invoking the routing function which is generally a slow and complicated procedure, it is performed prior to packet transmission handling, and hence it is not in the critical path that determines transmission latency.

Routing Path Setup

During routing path setup, the internal connection table of a WDM packet switch will be augmented with a label-switch look-up table, and contains the pertinent packet forwarding information. In particular, in the interest of achieving ultra-low latency and hardware simplicity, the inventive scheme produces label-switch states that remain constant along the flow path For example, label-switch assignments include the following techniques:

(1) Destination-based flow label assignment—In this scheme the destination, e.g. a suitable destination IP address prefix, can be used as the label-switch state in next hop look-up. In addition to having no need to modify the optical header, the same header can be used in the event of deflection routing.

(2) Route-based flow label assignment—In this scheme the label-switch state assigned refers to the end-to-end route that is computed dynamically at the label-switch state setup phase. The advantage of this scheme is that it can be specialized to meet the Quality-of-Service requirements for each individual label-switched states.

Switching Conflict Resolution

The present-;day lack of a viable optical buffer technology implies that conventional buffering techniques cannot be used to handle switching conflicts. As previously described, the invention embodiment utilizes fixed delay implemented by an optical fiber to allow switching to occur during this time delay, but not to achieve contention resolution as electrical buffers do in conventional IP routers. To resolve switching contentions, in accordance with the present invention, the following three methods are used:

(a) Limited wavelength interchange—where a packet is routed through the same path but at a different wavelength. Since this wavelength conversion is utilized just to avoid the contention, it is not necessary that the network elements must possess the capability of converting to any of the entire wavelength channels. Rather, it is sufficient if they can convert some of the entire wavelength channels. This wavelength conversion converts both the signaling header and the data payload. Care must be taken to prevent a packet from undergoing too many wavelength conversions which will result in poor signal fidelity. A possible policy is to allow only one conversion, which and can easily be enforced by encoding the original wavelength in the optical header. This way an intermediate WDM switch will allow conversion if and only if it is carried on its original wavelength.

(b) Limited deflection routing—where a packet may be deflected to a neighboring switching node from which it can be forwarded towards its destination. Care again must be taken to prevent a packet from being repeatedly deflected, thereby causing signal degradation, as well as wasting network bandwidth. A solution scheme is to record a "timestamp" field in the optical header, and allow deflections to proceed if and only if the recorded timestamp is no older than a maximum limit.

(c) Prioritized packet preemption—where a newly arrived packet may preempt a currently transmitting packet if the arriving packet has a higher priority. The objective is to guarantee fairness to all packets so that eventually a retransmitted packet can be guaranteed delivery. In this scheme, each packet again has a timestamp field recorded in its optical header, and older packets have higher priority compared to newer packets. Furthermore a retransmitted packet assumes the timestamp of the original packet. This way, as a packet "ages," it increases in priority, and will eventually be able to preempt its way towards its destination if necessary.

It is noted that in all these schemes the optical header can remain constant as it moves around in the network. This is consistent with the desire to keep the optical switching hardware fast and simple. It is also possible to consider combinations of these schemes.

Routing Protocol

For a network the size of the NGI, centralized routing decisions are quite unfeasible, so the approach needs to be generalized to distributed decision making. Hierarchical addressing and routing are used as in the case of IP routing. When a new connection is requested, NC&M 220 decides whether a WDM path is provisioned for this (source, destination) pair within the WDM-based network. If it is, the packets are immediately sent out on that (one-hop IP-level) path. If no such path is provisioned, NC&M 220 decides on an initial outbound link for the first WDM network element and a wavelength to carry the new traffic. This decision is based on the rest of the connections in the network at the time the new connection was requested. NC&M 220 then uses signaling, through an appropriate protocol, to transfer the relevant information to the initial WDM network element to be placed in the signaling header. After the initial outbound link is determined, the rest of the routing decisions are taken at the individual network element (NE's) according to the optical signaling header information. This method ensures that the routing tables at each switching node and the signaling header processing requirements are kept relatively small. It also enables the network to scale easily in terms of switching nodes and network users. It is noted, too, that multiple WDM subnetworks can be interconnected together and each subnetwork will have its own NC&M.

When a path is decided upon, within a WDM NE, the optical switches can be set in that state (i) for the duration of each packet through the node and then revert back to the default state (called optical label-switching), or (ii) for a finite, small amount of time (called flow switching). The former case performs routing on a regular packet-by-packet basis. The system resources are dedicated only when there is information to be sent and at the conclusion of the packet, these resources are available for assignment to another packet. The latter case is used for large volume bursty mode traffic. In this case, the WDM NE only has to read a flow state label from the optical signaling header of subsequent packets arriving at the NE to be sure such a packet is bound for the same destination, without the need to switch the switching device, and forward the payload through the already existing connection through the NE as previously established by the optical label-switching.

The packets are self-routed through the network using the information in the signaling header of each packet. When a packet arrives at a switching node, the signaling header is read and either the packet is forwarded immediately through an already existing flow state connection or a new appropriate outbound port is chosen according to the routing table. Routing tables in each node exist for each wavelength. If the packet cannot follow the selected outbound port because of contention with another packet (the selected outbound fiber is not free), the routing scheme will try to allocate a different wavelength for the same outbound port (and consequently the signal will undergo wavelength translation within the switching node). If no other eligible wavelength can be used for the chosen outbound port, a different outbound port may be chosen from another table, which lists secondary (in terms of preference) outbound links.

This routing protocol of the inventive technique is similar to the deflection routing scheme (recall the Background Section), where the session is deflected to some other outbound link (in terms of preference) if the preferred path cannot be followed. The packet is not allowed to be continuously deflected. In traditional routing protocols, a hop count is used to block a session after a specified number of hops. In the new scheme, in case no header regeneration is allowed at the switching nodes, then the hop count technique cannot be used. Alternatively, the optical signaling header characteristics (i.e., the signaling header's signaling to noise ratio can be looked upon to decide whether a packet should be dropped.

IP Routing Algorithm in WDM layer

The technique used by NC&M 220 to determine the routing tables is based upon shortest path algorithms that route the packets from source to destination over the path of least cost. Specific cost criteria on each route, such as length, capacity utilization, hop count, or average packet delay can be used for different networks. The objective of the routing function is to have good performance (for example in terms of low average delay through the network) while maintaining high throughput. Minimum cost spanning trees are generated having a different node as a root at each time, and the information obtained by these trees can then be used to set-up the routing tables at each switching node. If deflection routing as outlined above is implemented, the k-shortest path approach can be used to exploit the multiplicity of potential routing paths. This technique finds more than one shortest path, with the paths ranked in order of cost. This information can be inputted into the switching node routing tables, so that the outbound link corresponding to the minimum cost path is considered first, and the links corresponding to larger cost paths are inputted in secondary routing tables that are used to implement deflection routing.

Description of Plug-and-Play Modules

The present invention is based upon two types of Plug-and-Play modules to be attached to the WDM network elements. Introduction of these Plug-and-Play modules add optical label switching capability to the existing circuit-switched network elements.

Figure 7:
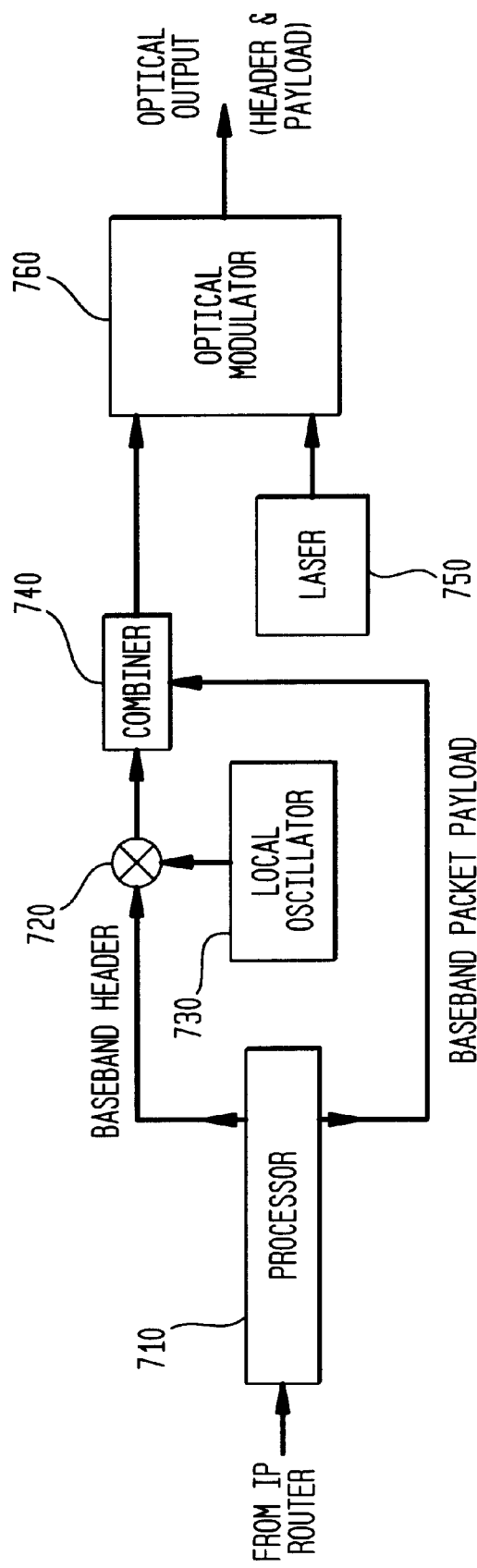
FIG. 7 depicts a block diagram of an illustrative embodiment of a header encoder circuit for the Plug-&-Play module of FIG. 3.
Figure 8:
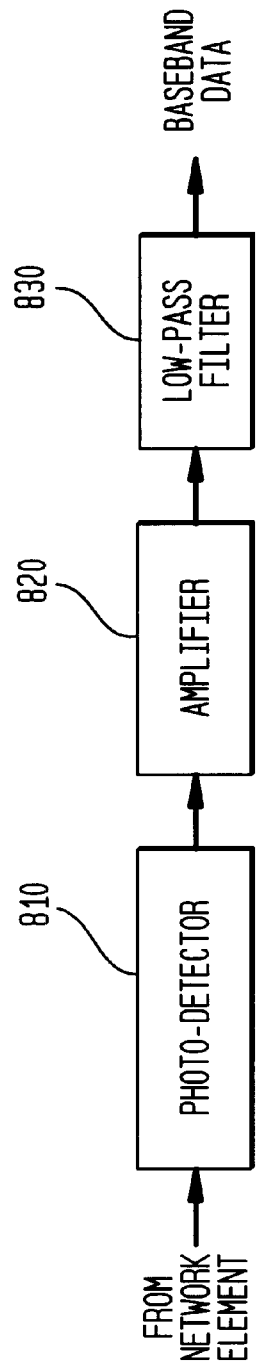
FIG. 8 depicts a block diagram of an illustrative embodiment of a header remover circuit for the Plug-&-Play module of FIG. 3.

In FIG. 3, both header encoder 321 and header remover 322 were shown in high-level block diagram form; FIGS. 7 and 8 show, respectively, a more detailed schematic for both encoder 321 and remover 322.

In FIG. 7, IP packets or datagrams are processed in microprocessor 710 which generates each optical signaling header 210 for label switching. Optical signaling header 210 and the original IP packet 211 are emitted from microprocessor 710 at baseband. Signaling header 210 is mixed in RF mixer 720 utilizing local oscillator 730. Both the mixed header from mixer 720 and the original packet 211 are combined in combiner 740 and, in turn, the output of combiner 740 is encoded to an optical wavelength channel via optical modulator 760 having laser 750 as a source of modulation.

In FIG. 8, the optical channel dropping out of a network element is detected by photodetector 81.0 and is electrically amplified by amplifier 820. Normally, both photodetector 810 and the amplifier 820 have a frequency response covering only the data payload but not the optical signaling header RF carrier frequency provided by local oscillator 730. Low-pass-filter 830 further filters out any residual RF carriers. The output of filter 830 is essentially the original IP packet sent out by the originating IP router from the originating network element which has been transported through the network and is received by another IP router at another network element.

Figure 9:
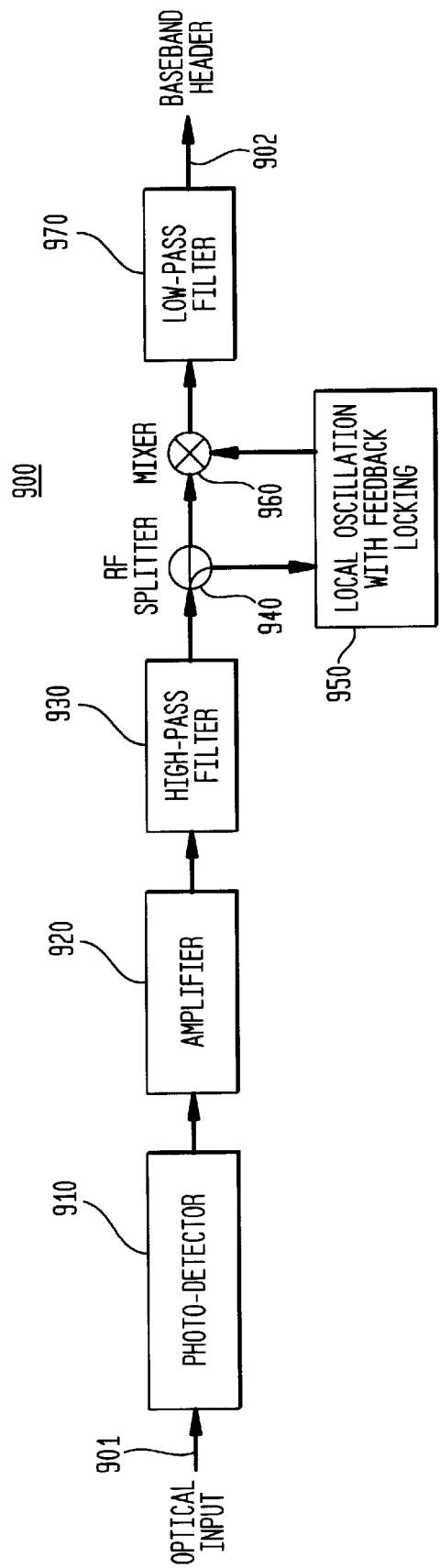
FIG. 9 depicts a block diagram of an illustrative embodiment of a header detector circuit for the Plug-&-Play module of FIG. 4.

Block diagram 900 of FIG. 9 depicts the elements for the detection process effected by Plug-and-Play module 410 of FIG. 4 to convert optical signal 901, which carries both label-switching signaling header 210 and the data payload 211, into baseband electrical signaling header 902. Initially, optical signal 901 is detected by photodetector 910; the output of photodetector 910 is amplified by amplifier 920 and filtered by high-pass filter 930 to retain only the high frequency components which carry optical signaling header 210. RF splitter 940 provides a signal to local oscillator 950, which includes feedback locking. The signal from local oscillator 950 and the signal from splitter 940 are mixed in mixer 960, that is, the high frequency carrier is subtracted from the output of filter 920 to leave only the information on label-switching signaling header 210. In this process, local oscillator 950 with feedback locking is utilized to produce the local oscillation with the exact frequency, phase, and amplitude, so that the high frequency component is nulled during the mixing of this local oscillator signal and the label-switching signaling header with a high-frequency carrier. Low-pass filter 970, which is coupled to the output of mixer 960, delivers baseband signaling header 210 as electrical output signal 902.

Figure 10:
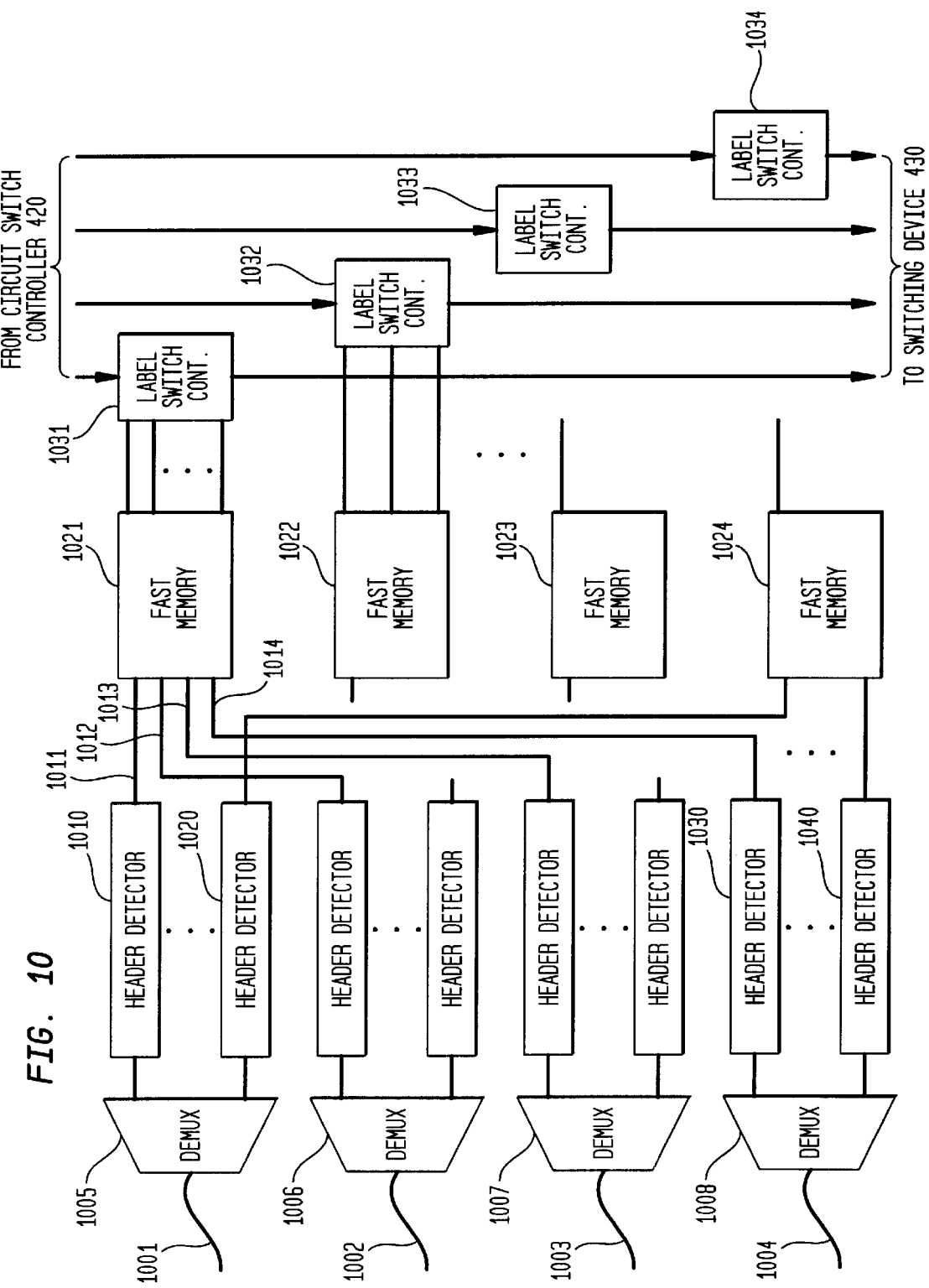
FIG. 10 depicts a block diagram for a more detailed embodiment of FIG. 4 wherein the label-switch controller includes interposed demultiplexers, and header detectors and fast memory.

The circuit diagram of FIG. 10 shows an example of a more detailed embodiment of FIG. 4. In FIG. 10, each header detector 1010, 1020, . . . , 1050, . . . , or 1080 processes information from each wavelength composing the optical inputs arriving on paths 1001, 1002, 1003, and 1004 as processed by demultiplexers 1005, 1006, 1007, and 1008, respectively; each header detector is exemplified by the circuit 900 of FIG. 9. The processed information is grouped for each wavelength. Thus, for example, fast memory 1021 receives as inputs, for a given wavelength, the signals appearing on lead 1011 from header detector 1010, . . . , the signals appearing on lead 1012 from header detector 1030, the signals appearing on lead 1013 from header detector 1050, and the signals appearing on lead 1014 from header detector 1070. Each fast memory 1021–1024, such as a content-addressable memory, serves as an input to a corresponding label switch controller 1031–1034. Each label switch controller 1031–1034 also receives circuit-switched control signals from network element switch controller 420 of FIG. 4. Each label switch controller intelligently chooses between the circuit switched control as provided by controller 420 and the label switched information supplied by its corresponding fast memory to provide appropriate control signals the switching device 430 of FIG. 4.

Figure 11:
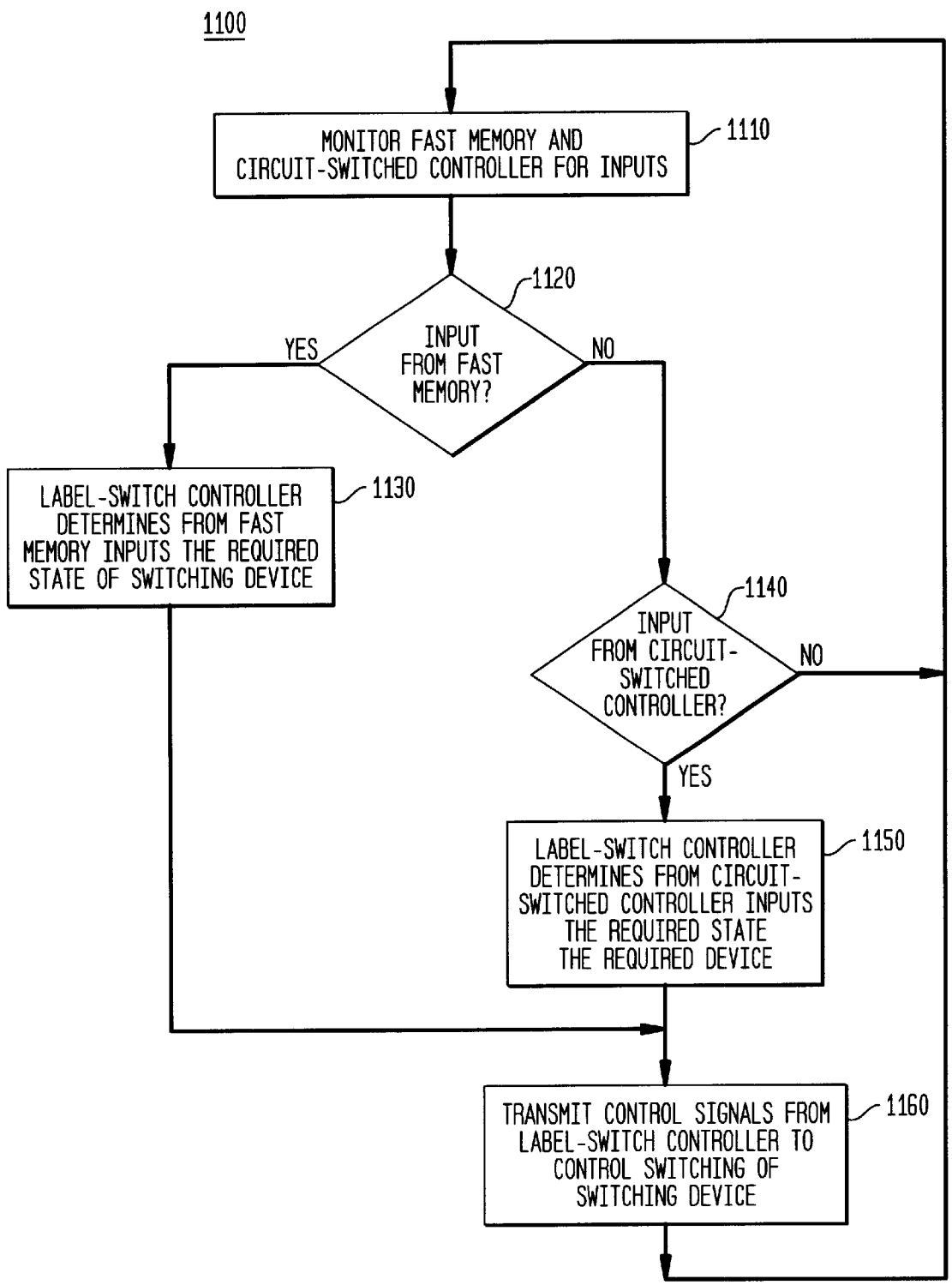
FIG. 11 is a flow diagram for the processing effected by each label-switch controller of FIG. 10.

Flow diagram 1100 of FIG. 11 is representative of the processing effected by each label-switch controller 1031–1034. Using label-switch controller 1031 as exemplary, inputs from circuit-switched controller 420 and inputs from fast memory 1021 are monitored, as carried out by processing block 1110. If no inputs are received from fast memory 1021, then incoming packets are circuit-switched via circuit-switched controller 420. Decision block 1120 is used to determine if there are any inputs from fast memory 1021. If there are inputs, then processing block 1130 is invoked so that label-switch controller 1031 can determine from the fast memory inputs the required state of switching device 430. Then processing block 1160 is invoked to transmit control signals from label-switch controller 1031 to control switching device 430. If there are no fast memory inputs, then the decision block 1140 is invoked to determine if there are any inputs from circuit-switched controller 1140. If there are inputs from circuit-switched controller 420, then processing by block 1150 is carried out so that label-switch controller 1031 determines from the inputs of circuit-switched controller 420 the required state of switching device 430. Processing block 1160 is again invoked by the results of processing block 1150. If there are no present inputs from circuit-switched controller 1140 or upon completion of procession block 1160, control is returned to processing block 1110.

By way of reiteration, optical label-switching flexibly handles all types of traffic: high volume burst, low volume burst, and circuit switched traffic. This occurs by interworking of two-layer protocols of the label-switched network control. Thus, the distributed switching control rapidly senses signaling headers and routes packets to appropriate destinations. When a long stream of packets reach the network element with the same destination, the distributed switching control establishes a flow switching connection and the entire stream of the packets are forwarded through the newly established connections.

A label switching method scales graciously with the number of wavelengths and the number of nodes. This results from the fact that the distributed nodes process multi-wavelength signaling information in parallel and that these nodes incorporate predicted switching delay in the form of fiber delay line. Moreover, the label switching utilizes path deflection and wavelength conversion for contention resolution.

Optical Header Processing

The foregoing description focused on optical header processing at a level commensurate with the description of the overall NGI system configured with the overlaid Plug-and-Play modules. Discussion of header processing at a more detailed level is now appropriate so as to exemplify how low-latency can be achieved at the circuit-detail level.

Figure 12:
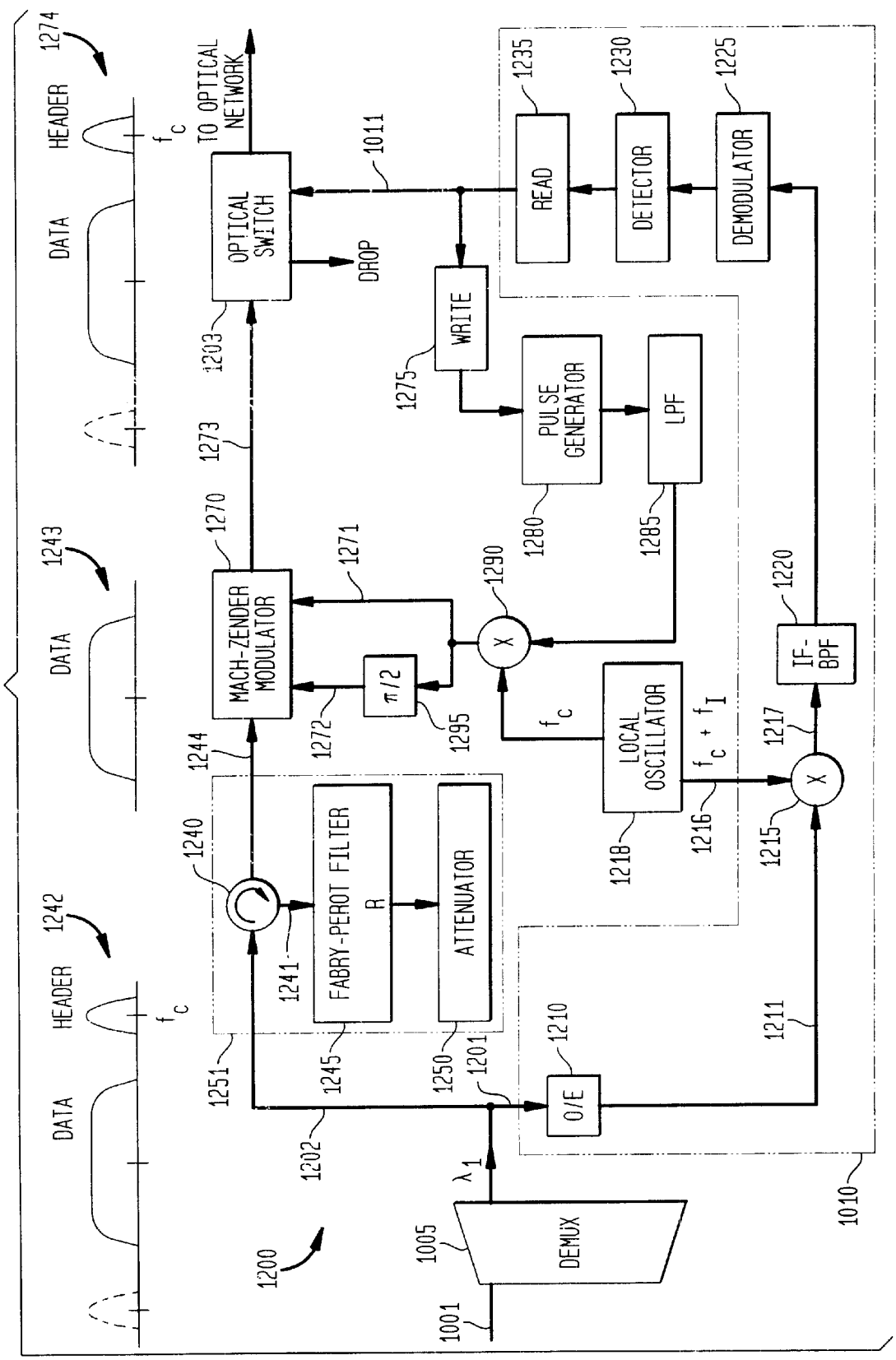
FIG. 12 is a block diagram of circuitry for removing the header with the reflective part of a notch filter and for inserting a new single-sideband modulated header.

To this end, opto-electrical circuitry 1200 of FIG. 12, which is a more detailed block diagram elucidating certain aspects of prior figures, especially FIGS. 9 and 10, is considered. By way of a heuristic overview, the processing carried out by the opto-electrical circuitry 1200 is such that a header signal (e.g., 155 Mb/s on a microwave carrier) is frequency-division multiplexed with a baseband data payload (e.g., 2.5 Gb/s). The header signal is processed by a single-sideband (SSB) modulator, so only the upper sideband representation of the header signal is present in the frequency-division multiplexed signal. Moreover, the technique effected by circuitry 1200 is one of label replacement wherein the original header signal at the given carrier frequency is first removed in the optical domain, and then a new header signal is inserted at the same carrier frequency in the optical domain. A notch filter is used to remove the original header signal; the notch filter is realized, for example, by the reflective part of a Fabry-Perot filter.

In particular, circuitry 1200 has as its input the optical signal at optical wavelength $\lambda_1$ on path 1001 as received and processed by demux 1005, both of which are re-drawn from FIG. 10. Circuitry 1200 is composed of: a lower path to process optical signal 1201 emanating from demux 1005; and an upper path to process optical signal 1202 emanating from demux 1005. The lower path derives the label, conveyed by the incoming SSB header in optical signal 1001, to control optical switch 1203; switch 1203 is a multi-component element encompassing components already described, including fast memory 1021 and label switch controller 1031 of FIG. 10 as well as switching device 430 of FIG. 4. The upper path is used to delete the old header signal, including the label, at the sub-carrier frequency and then insert a new header label, in a manner to be described below after the lower path is first described.

The lower path is an illustrative embodiment of header detector 1010 originally shown in high-level block diagram form in FIG. 10. In particular, header detector 1010 includes, in cascade: (a) opto-electrical converter 1210 (e.g..;a photodetector) for producing electrical output signal 1211; (b) multiplier 1215 to convert electrical signal 1211 to intermediate frequency signal 1217—to accomplish this, multiplier 1215 is coupled to local oscillator 1218 which provides a sinusoid 1216 at a frequency to down-convert the incoming sub-carrier conveying the header label, designated for discussion purposes as $f_c$, to an intermediate frequency $f_i$; (c) intermediate frequency bandpass filter 1220 having signal 1217 as its input; (e) demodulator 1225 to convert the intermediate frequency to baseband; (e) detector 1230 responsive to demodulator 1225; and (f) read circuit 1235 which outputs signal on lead 1011 of FIG. 10. Elements 1211, 1215, 1216, 1217, 1220, 1225, and 1230 can all be replaced by a simple envelope detector if the subcarrier header was transmitted using an incoherent modulator such as ASK (amplitude-shift keying). It is not always required to use a coherent demodulator as shown in FIG. 12. (In fact, FIG. 13 will depict the case for an incoherent modulation).

The operation of header detector 1010 of FIG. 12 is as follows. It is assumed that the second type of 'Plug-and-Play' module of FIG. 4 injects a 2.5 Gbps IP data packet (e.g., with QPSK/QAM modulation) which is sub-carrier multiplexed with a 155 Mbps single-sideband header packet (e.g., with SSB modulation) at the modulation frequency $f_c$; as before, the header precedes the data payload in time and both are carried by the optical wavelength $\lambda_1$. In each network node that receives the combined header and payload at wavelength $\lambda_1$, the sub-carrier header at $f_c$ is multiplied by multiplier 1215, is band-pass filtered by intermediate filter 1220, and is demodulated to baseband by demodulator 1225. Then, the demodulated baseband data burst is detected by detector 1230 (e.g., a 155 Mbps burst-mode receiver), and read by circuit 1293 (e.g., a microprocessor).

This foregoing operational description has focused only on the detection of the optical header to control the routing path through switch 1203. As alluded to in the Background Section, header replacement is now considered important to present-day NGI technology so as to accomplish high-throughput operation in a packet switched network in which data paths change due to, for example, link outages and variable traffic patterns. Moreover, header replacement is useful to maintain protocol compatibility. The upper path components of FIG. 12 that have heretofore not been described play a central role in header replacement. Actually, the notion of header replacement has a broader connotation in that the header may be composed of various fields, such as a "label" field and a "time-to-leave" field. The description to this point has used the header and label interchangeably; however, it is now clear that the header may actually have a plurality of fields, and as such any or all may be replaced at any node.

Now continuing with the description of FIG. 12, the upper processing path which processes the optical signal on path 1202 includes: (a) circulator 1240; (b) Fabry-Perot (FFP) filter 1245, coupled to circulator 1240 via path 1241, with filter 1245 being arranged so that one notch in its free spectral range (FSR) falls at $f_c$; and (c) attenuator 1250 coupled to the reflective port (R) of FFP 1245. An exemplary FFP 1245 is available from The Micron Optics, Inc. as model No. FFP-TF ("Fiber Fabry-Perot Tunable Filter"). The combination of these latter three elements, shown by reference numeral 1251, produces a notch filter centered at $f_c$ which removes the SSB header signal propagating with $f_c$ as its center frequency, as shown pictorially by the spectra in the upper portion of FIG. 12. As illustrated, spectrum 1242 of signal 1202 includes both a baseband data spectrum and the header signal spectrum centered at $f_c$. After processing by notch filter 1251, spectrum 1243 obtains wherein only the baseband data spectrum remains.

The output of notch filer 1251, appearing on path 1244 of circulator 1240, serves as one input to Mach-Zender modulator (MZM) 1270. Two other inputs to MZM 1270 are provided, namely, via path 1271 emanating from multiplier 1290 and via path 1272 emanating from phase shift device 1295. As discussed in the next paragraph, the signal appearing on lead 1271 is the new header signal which is double-sideband in nature. The signal on path 1272 is phase-shifted by $\pi/2$ relative to the signal on path 1271. MZM 1270 produces at its output the upper-sideband version of the signal appearing on path 1271, that is, the new header signal.

The single-sideband processing effected by MZM 1270 is described in detail in the paper entitled "Overcoming Chromatic-Dispersion Effects in Fiber-Wireless Systems Incorporating External Modulators", authored by Graham H. Smith et al., as published in the IEEE Transactions on Microwave Theory and Techniques, Vol. 45, No. 8, August 1997, pages 1410–1415, which is incorporated herein by reference. Moreover, besides converting the new header signal to an optical single-sideband signal (OSSB), MZM 1270 also adds this OSSB signal to the incoming optical baseband signal on path 1244 to produce the desired frequency-multiplexed signal of baseband plus SSB header on output path 1273 from MZM 1270.

The new header signal delivered by path 1271 is derived as follows. Write circuit 1275 is responsible for providing data representative of a new header signal, such as a new label represented in binary. The header signal that arrives at the input to demux 1005 is referred to as the active header signal. The replacement header signal is called the new header signal. Write circuit 1275 has as its input the output of read device 1235, so write circuit 1275 can reference or use information from the active header signal to derive the new header signal, if necessary. The new header signal, as provided at the output of write circuit 1275, is delivered to pulse generator 1280, which performs the operation of converting the new header signal data to, as exemplary, a 155 Mb/s signal on a microwave carrier. The signal from generator 1280 is filtered by low-pass filter 1285 to remove spurious high-frequency energy. Then the signal from filter 1285 is delivered to modulator 1290; modulator 1290 also has as a sinusoidal input at frequency $f_c$ provided by local oscillator 1218. The output of modulator 1290, which appears on path 1271, is the new header signal centered at a frequency of the local oscillator, namely $f_c$; also, the output of modulator 1290 serves as the only input to phase-shift device 1295.

MZM 1270 produces a spectrum that includes both the original baseband data spectrum as well as the spectrum of the new header signal at $f_c$. This is shown in frequency domain visualization 1274 in the top right-hand corner of FIG. 12, which is counterpart of the visualization in the top left-hand corner.

The new optical signal on path 1273 is switched via optical switch 1203, as controlled by the active or original incoming header signal, under control of the label on lead 1011

It is noted that, in terms of presently available components, the processing time of the header removal and insertion technique should take less than 30 ns. On the other hand, if it is assumed that there are 15 bits in each packet header signal, then the time to read 15 bits, write 15 bits, and add 10 preamble bits can take about 260 ns for a 155 Mbps burst. Therefore, allowing for some variations, each header signal is about 300 ns. This means that it may be necessary to insert a delay line in the main optical path between circulator 1240 and MZM 1270 of 300 ns, so the length of delay line would be around 60 meters. To save processing time, the data rate of the subcarrier header can be increased to, for example, 622 Mb/s or higher, depending upon the future network environment.

Another Illustrative Embodiment of a Header Removal and Insertion Technique

Figure 13:
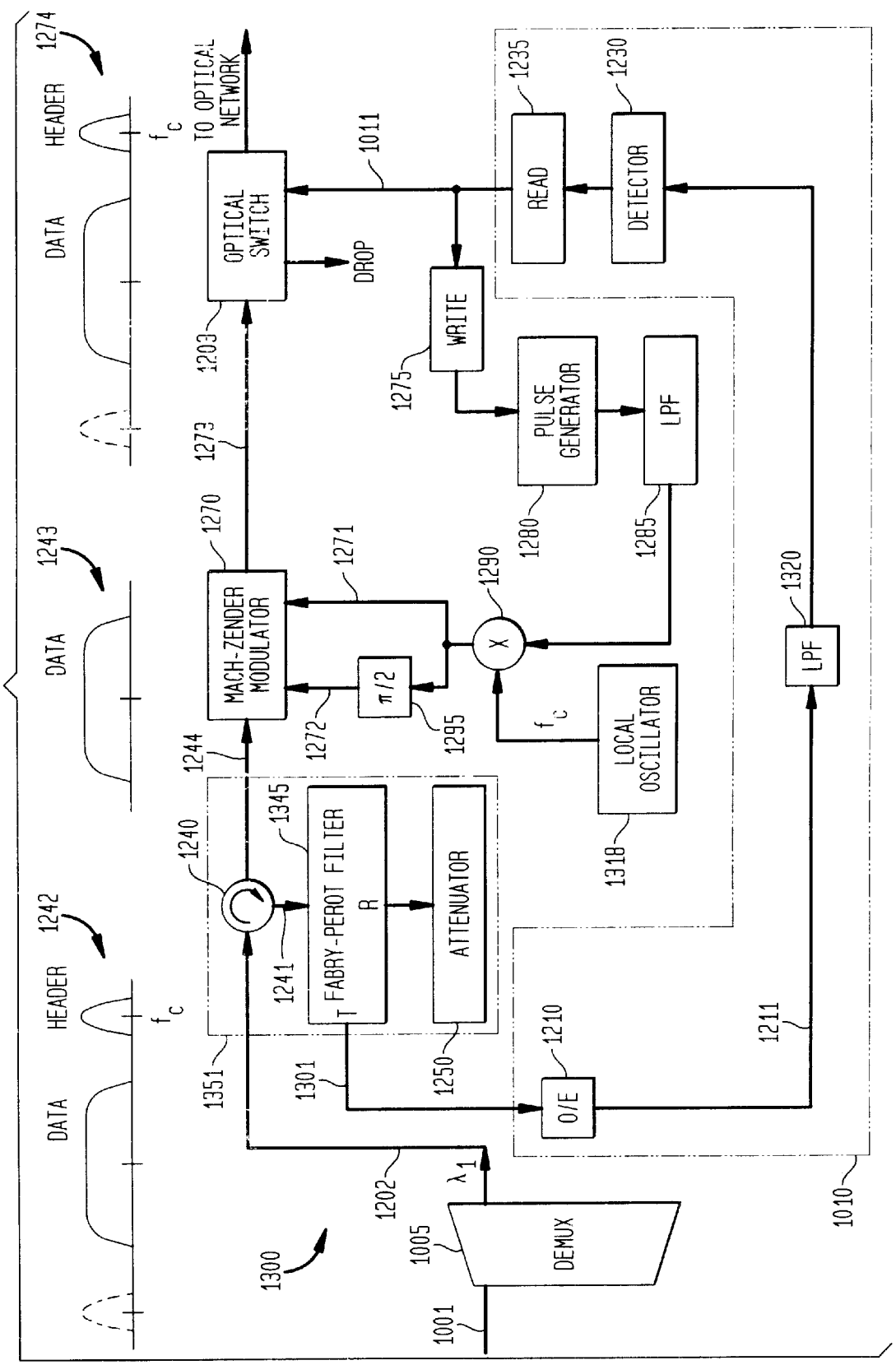
FIG. 13 is a block diagram of circuitry for the detecting the header with the transmission part of the notch filter, for removing the header with the reflective part of a notch filter, and for inserting a new single-sideband modulated header.

The circuit arrangement of FIG. 12 is realized using the so-called reflective port of FFP 1245. FFP 1245 also has a transmission port which may be utilized wherein the characteristics of the optical signal emanating from the transmission port are the converse of the optical signal from the reflective port. So whereas the reflective port provides an attenuation notch at $f_c$, the transmission port attenuates frequencies relative to $f_c$, so that only frequencies in the vicinity of $f_c$ are passed by the transmission port. An alternative to circuitry 1200 of FIG. 12 is shown by circuitry 1300 of FIG. 13. The main difference between FIGS. 12 and FIG. 13 is the manner in which the lower processing path now derives its input signal via path 1301 (as compared to input signal on path 1201 of FIG. 12).

In particular, FFP 1325 now has a transmission (T) port in addition to the reflective (R) port. The output from transmission port, on path 1301, now serves as the input to opto-electrical converter 1210. Because the signal on path 1301 conveys only frequencies centered about $f_c$, that is, the baseband data information has been attenuated by FFP notch filter 1345, and can be processed directly by detector 1230 via LPF 1320. The remainder of circuitry 1300 is essentially the same as circuitry 1200 of FIG. 12.

Optical Technology

Optical technologies span a number of important aspects realizing the present invention. These include optical header technology, optical multiplexing technology, optical switching technology, and wavelength conversion technology.

(a) Optical Header Technology

Optical header technology includes optical header encoding and optical header removal as discussed with respect to FIGS. 3 and 4. In effect, optical header 210 serves as a signaling messenger to the network elements informing the network elements of the destination, the source, and the length of the packet. Header 210 is displaced in time compared to the actual data payload. This allows the data payload to have any data rates/protocols or formats.

(b) Optical Multiplexing Technology

Optical multiplexing may illustratively be implemented using the known silica arrayed waveguide grating structure. This waveguide grating structure has a number of unique advantages including: low cost, scalability, low loss, uniformity, and compactness.

(c) Optical Switching Technology

Fast optical switches are essential to achieving packet routing without requiring excessively long fiber delay as a buffer.

Micromachined Electro Mechanical Switches offer the best combination of the desirable characteristics: scalability, low loss, polarization insensitivity, fast switching, and robust operation. Recently reported result on the MEM based Optical Add-Drop Switch achieved 9 microsecond switching time (d) Wavelength Conversion Technology Wavelength conversion resolves packet contention without requiring path deflection or packet buffering. Both path deflection and packet buffering cast the danger of skewing the sequences of a series of packets. In addition, the packet buffering is limited in duration as well as in capacity, and often requires non-transparent methods. Wavelength conversion, on the other hand, resolves the blocking by transmitting at an alternate wavelength through the same path, resulting in the identical delay. Illustratively, a WSXC with a limited wavelength conversion capability is deployed.

Although various embodiments which incorporate the teachings of the present invention have been shown and described in detail herein, those skilled in the art can readily devise many other varied embodiments that still incorporate these teachings.

What is claimed is:

1. A method for propagating a data payload from an input network element to an output network element in a wavelength division multiplexing (WDM) network composed of a plurality of network elements, the data payload having a given format and protocol, the method comprising the steps of generating and storing a local routing look-up table in each of the network elements, each local routing table determining alternative local routes through the associated one of the network elements, adding a header to the data payload prior to inputting the data payload to the input network element to produce an optical signal, the header having a format and protocol and being indicative of a local route through each of the network elements for the data payload and the header, the format and protocol of the data payload being independent of the format and protocol of the header, detecting the header at the network elements to produce a switch control signal as the data payload and header propagate through the WDM network, selecting one of the local routes for routing the optical signal through the network elements as determined by looking up the switch control signal in the corresponding local routing table, and routing the optical signal through the network elements in correspondence to the selected route, wherein the header is conveyed by a single sideband signal occupying a given frequency band above the data payload, the method further comprising, prior to the step of routing, the steps of optically filtering the optical signal with a reflective part of a notch filter to delete the header and recover the data payload, and inserting a new single-sideband header at the given frequency band into the optical signal in place of the deleted header.

2. The method as recited in claim 1 wherein the step of detecting includes the steps of opto-electrically converting the optical signal to detect the header, and processing the header to produce a switch control signal to route the incoming optical signal.

3. The method as recited in claim 2 wherein the step of processing includes the step of demodulating the detected header to produce header information.

4. The method as recited in claim 3 wherein the step of processing further includes the step of reading the header information to produce the switch control signal.

5. The method as recited in claim 2 wherein the step of processing includes the steps of generating an intermediate frequency (IF) electrical signal from the detected header, demodulating the IF electrical signal to produce a demodulated signal, detecting the demodulated signal to produce header information, and reading the header information to produce the switch control signal.

6. The method as recited in claim 1 wherein the notch filter is a Fabry-Perot filter having a free-spectral range centered on the given frequency band.

7. The method as recited in claim 6 wherein the step of detecting includes the steps of opto-electrically converting the optical signal to detect the header, demodulating the detected header to produce header information, and reading the header information to produce the switch control signal.

8. The method as recited in claim 1 wherein the step of inserting includes the step of single-sideband modulating the new header with a carrier in the given frequency band.

9. The method as recited in claim 1 wherein the step of inserting includes the step of single-sideband modulating the new header and the data payload with a Mach-Zender modulator.

10. The method as recited in claim 1 further including an add-drop optical switch controlled by the switch control signal and wherein the step of inserting further includes the step of supplying the new single-sideband header and the data payload to the add-drop optical switch.

11. The method as recited in claim I wherein the step of inserting the new header includes the step of referencing the local routing table for routes through the optical switch.

12. A system for propagating a data payload from an input network element to an output network element in a wavelength division multiplexing (WDM) network composed of a plurality of network elements, the data payload having a given format and protocol, the system comprising a route generator for generating and storing a local routing look-up table in each of the network elements, each local routing table determining alternative local routes through the associated one of the network elements, an adder for adding a header to the data payload prior to inputting the data payload to the input network element to produce an optical signal, the header having a format and protocol and being indicative of a local route through each of the network elements for the data payload and the header, the format and protocol of the data payload being independent of the format and protocol of the header, a detector for detecting the header at the network elements to produce a switch control signal as the data payload and header propagate through the WDM network, a router for selecting one of the local routes for routing the optical signal through the network elements as determined by looking up the switch control signal in the corresponding local routing table, and a switch for routing the optical signal through the network elements in correspondence to the selected route, wherein the header is conveyed by a single-sideband signal occupying a given frequency band above the data payload, the detector further comprising
an opto-electrical converter for converting the optical signal to detect the header, and
a processor, coupled to opto-electrical converter, for processing the header to produce a switch control signal to route the optical signal, the system further comprising
an optical notch filter for filtering the optical signal with a reflective part of the notch filter to delete the header and recover the data payload, and
means, coupled to the notch filter, for inserting a new single-sideband header at the given frequency band into the optical signal in place of the deleted header.

* * * * *